(12) United States Patent
Kimbell et al.

(10) Patent No.: US 11,241,696 B2
(45) Date of Patent: Feb. 8, 2022

(54) MATERIAL PROCESSING MACHINE WITH A COLORIZER SYSTEM AND METHODS OF REDUCING AND COLORIZING WASTE MATERIAL

(71) Applicant: Smoracy, LLC, Remus, MI (US)

(72) Inventors: Kyle Douglas Kimbell, Vestaburg, MI (US); Chad Dale Cross, Shepherd, MI (US)

(73) Assignee: Smoracy, LLC, Remus, MI (US)

( * ) Notice: Subject to any disclaimer, the term of this patent is extended or adjusted under 35 U.S.C. 154(b) by 146 days.

(21) Appl. No.: 16/565,897

(22) Filed: Sep. 10, 2019

(65) Prior Publication Data

US 2020/0078794 A1 Mar. 12, 2020

Related U.S. Application Data

(60) Provisional application No. 62/729,164, filed on Sep. 10, 2018.

(51) Int. Cl.
*B02C 23/08* (2006.01)
*B02C 13/286* (2006.01)

(52) U.S. Cl.
CPC ............ *B02C 23/08* (2013.01); *B02C 13/286* (2013.01); *B02C 2013/28609* (2013.01); *B02C 2013/28636* (2013.01)

(58) Field of Classification Search
CPC . B02C 23/08; B02C 13/286; B02C 13/28609; B02C 13/28636; B02C 2013/165; B02C 21/02; B02C 18/145
See application file for complete search history.

(56) References Cited

U.S. PATENT DOCUMENTS

| | | |
|---|---|---|
| 3,129,739 A | 4/1964 | Wenger |
| 3,254,687 A | 6/1966 | Tertyshnikov |
| 4,245,999 A | 1/1981 | Reiniger |
| 4,440,635 A | 4/1984 | Reiniger |
| 4,794,022 A | 12/1988 | Johnson et al. |
| 5,308,653 A | 5/1994 | Rondy |
| 5,358,738 A | 10/1994 | Sawka |
| 5,362,004 A | 11/1994 | Bateman |
| 5,372,316 A | 12/1994 | Bateman |
| 5,863,003 A | 1/1999 | Smith |
| 5,975,443 A | 11/1999 | Hundt et al. |
| 5,988,539 A | 11/1999 | Morey |
| 6,000,642 A | 12/1999 | Morey |
| 6,032,707 A | 3/2000 | Morey et al. |
| 6,036,125 A | 3/2000 | Morey et al. |
| 6,047,912 A | 4/2000 | Smith |

(Continued)

*Primary Examiner* — Faye Francis
(74) *Attorney, Agent, or Firm* — Howard & Howard Attorneys PLLC

(57) ABSTRACT

A material processing machine having a reducing system for material reducing operations is disclosed. The reducing system includes a rotor having processing tools to reduce the material within a reducing chamber. A colorizer system includes a manifold positioned adjacent a screen defining a plurality of apertures for directing colorant from a colorant source through the apertures towards the reducing system. The material reducing operations include a two-stage reducing operation with selectively interchangeable screens that incrementally reduce the material to provide substantially uniform colorizing and material size.

17 Claims, 17 Drawing Sheets

(56) References Cited

U.S. PATENT DOCUMENTS

| | | | |
|---|---|---|---|
| 6,059,210 A | 5/2000 | Smith | |
| 6,207,228 B1 | 3/2001 | Hundt et al. | |
| 6,299,082 B1 | 10/2001 | Smith | |
| 6,357,684 B1 | 3/2002 | Morey | |
| 6,517,020 B1 | 2/2003 | Smith | |
| 6,722,596 B1 | 4/2004 | Morey | |
| 6,814,320 B1 | 11/2004 | Morey et al. | |
| 6,830,204 B1 | 12/2004 | Morey | |
| 6,845,931 B1 | 1/2005 | Smith | |
| 7,121,485 B2 | 10/2006 | Smith | |
| 7,163,166 B1 | 1/2007 | Smith | |
| 7,384,011 B1 | 6/2008 | Smith | |
| 7,726,594 B2 | 6/2010 | Smith | |
| 9,604,227 B2 * | 3/2017 | Lieser | B02C 18/14 |
| 10,300,490 B2 * | 5/2019 | Langtry | B02C 13/09 |
| 10,927,516 B2 * | 2/2021 | Langtry | C22C 38/38 |
| 2012/0097773 A1 * | 4/2012 | Medoff | B29B 7/905 241/24.1 |
| 2016/0136650 A1 * | 5/2016 | Langtry | B02C 13/28 241/55 |

\* cited by examiner

MATERIAL PROCESSING MACHINE WITH A COLORIZER SYSTEM AND METHODS OF REDUCING AND COLORIZING WASTE MATERIAL

CROSS REFERENCE TO RELATED APPLICATIONS

The present application claims priority to and all the benefits of U.S. Provisional Patent Application No. 62/729,164, filed on Sep. 10, 2018, which is hereby expressly incorporated by reference in its entirety.

BACKGROUND

A variety of machines have been developed to chip, cut, grind, or otherwise reduce waste materials such as wood, brush, and green waste. Exemplary material processing machines include chippers (disk and drum types), hammer mills, hogs, shredders, forestry mulchers, and the like. The machines typically comprise material processing systems including an infeed system, a reducing system, and a discharge system. The infeed system directs the waste material to the reducing system and the material reducing system reduces the same, after which the reduced waste material is discharged via the discharge system.

One common use for the reduced waste material is landscaping. The benefits of mulching or applying green waste material to a landscape such as a yard or garden may include conserving soil moisture, maintaining uniform soil temperature, minimizing soil erosion and compaction, reducing weed problems, and altering the soil structure to increase root growth. The mulch may further provide a neater, more finished appearance to the flowerbed, garden or other landscape.

To further improve the aesthetics of the mulch, the color of the reduced waste material may be selectively changed. U.S. Pat. No. 3,254,687 to Tertyshnikov discloses introducing bleaching agents such as artificial urea, acid, and alkali solutions, which effectively lightens and even whitens processed livestock feed. The reference also discloses introducing additives such as molasses, which effectively darkens the feed material. Commercially available colorants typically include various shades of red and brown (including burgundy and cocoa), black, yellow, gold, cypress and orange. The form of the colorant may be liquid, granular, and powdered, or combinations thereof. The colorants may further provide mold and fungus protection as well as prevent discoloration caused by microbial attack.

In material processing applications applying colorant, improving the coverage of the colorant on the reduced waste material is an area of particular interest and development. U.S. Pat. No. 5,358,738 to Sawka discloses directly spraying the colorant onto the surfaces of the previously reduced wood chips. Likewise, a system produced by Rotochopper Inc. (Martin, Minn.), as disclosed in U.S. Pat. No. 6,207,228 to Hundt et al., applies the colorant directly to waste material before and after the waste material has been reduced by the reducing system. Spraying the colorant directly onto the material is deficient since at least some of the reduced waste material may not receive colorant. Particulate closest to the nozzles may receive relatively more colorant and/or obstruct the path of the colorant to remaining particulate, resulting in non-uniform application of the colorant. Further, the reduced waste material of the Rotochopper system has an opportunity to exit the reducing chamber prior to application of the colorant such that at least a portion of the material may not receive any colorant whatsoever. Therefore, a need in the art exists for systems and methods to produce material with uniformly-applied colorant.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 1:
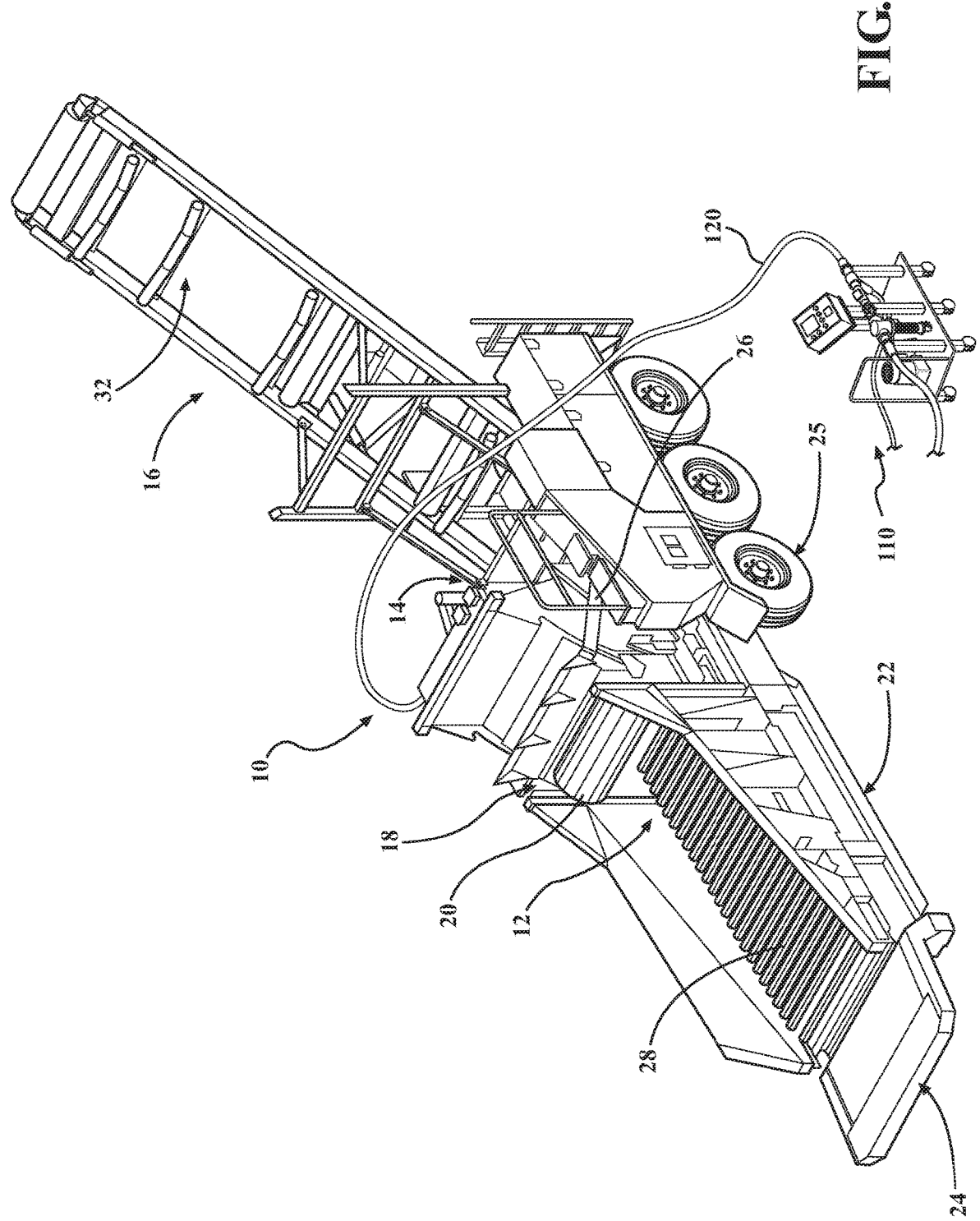
FIG. 1 is a perspective view of a material processing machine with a colorizer system in accordance with an exemplary embodiment of the present disclosure.
Figure 14:
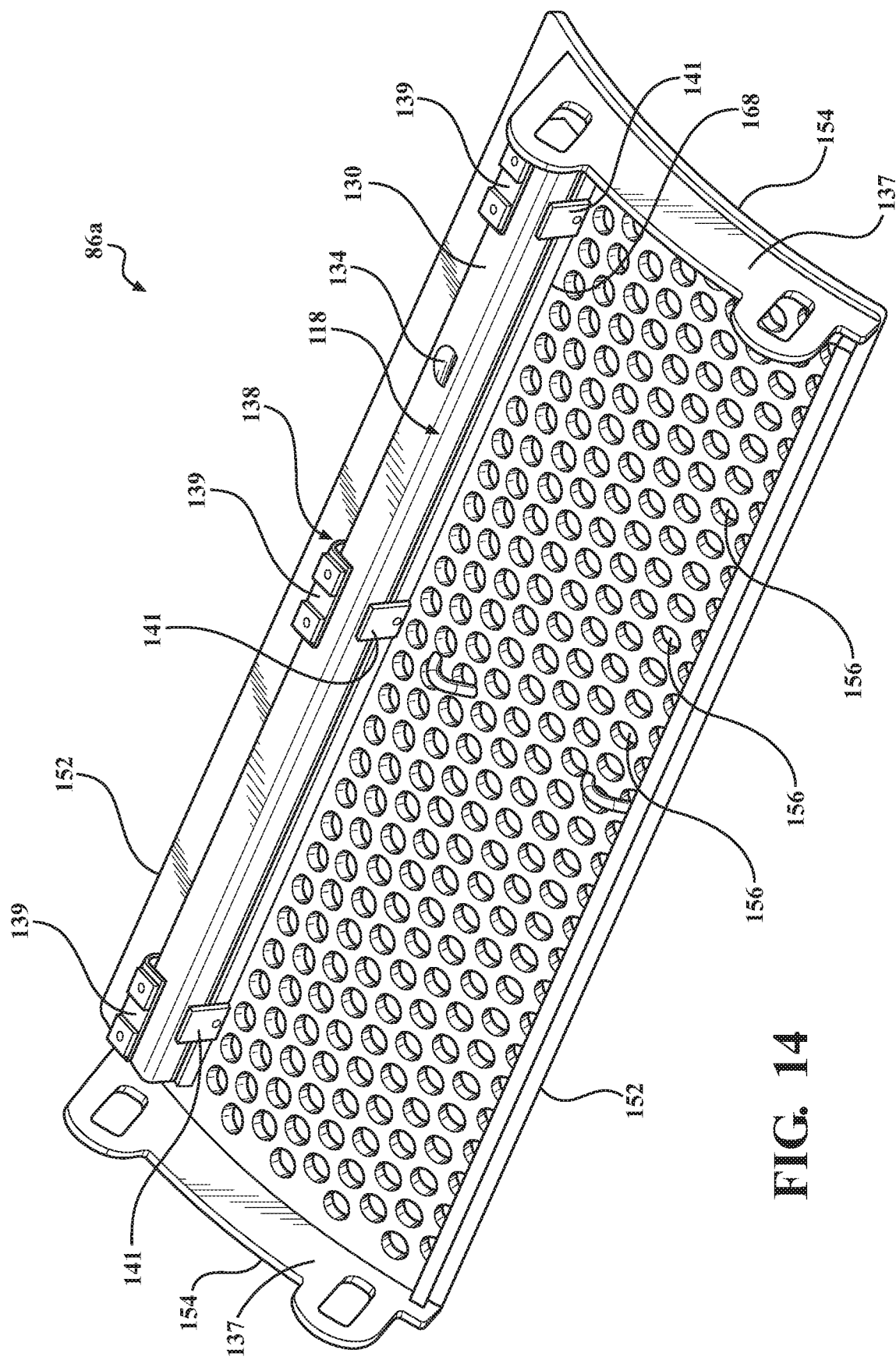
FIG. 14 is a bottom perspective view of the screen and the manifold of FIG. 13.

FIG. 1 illustrates an exemplary material processing machine 10 comprising an infeed system shown generally at 12, a reducing system shown generally at 14, and a discharge system shown generally at 16. Waste material enters the material processing machine 10 through the infeed system 12 where it is directed to the reducing system 14. The reducing system 14 reduces the waste after which the discharge system 16 expels the waste from the material processing machine 10. A colorizer system 110 to be described may be positioned near and coupled to the material processing machine 10 with a line 120 to provide colorant to the waste being reduced with the reducing system 14 (a portion of the colorizer system 110 would typically be positioned near the machine 10 as illustrated in FIG. 14 such that the line 120 is not required to traverse the machine 10).

Certain aspects of the infeed system 12 and discharge system 16 are well known in the art and will only be described generally. For example, known aspects are at least partially described in detail in U.S. Pat. No. 5,362,004, issued Nov. 8, 1994, and U.S. Pat. No. 5,372,316, issued Dec. 13, 1994, which are incorporated by reference in their entireties. Referring to FIG. 1, the infeed system 12 comprises a feed wheel assembly 18. The feed wheel assembly 18 comprises one or more feed wheels 20 rotatably mounted to a suitable structure of the infeed system 12. The feed wheels 20 are configured to move the waste material to the reducing system 14. Subsequent to material reduction, the waste material is directed to the discharge system 16 and discharged from the material processing machine 10.

The material processing machine 10 is supported on a trailer frame 22 having a tongue mount 24 and wheels 25 at the front and rear of the frame 22, respectively. An exemplary frame 22 may comprise ¼" thick steel with 20" deep formed high tensile steel plating and cross-section bracing using continuous welds for structural integrity. The wheels 25 may be coupled to 25,000 pound air-brake axles. In another embodiment, the material processing machine 10 includes opposing tracks as an alternative to the wheels 25. In the exemplary embodiment illustrated in FIG. 1, the infeed system 12, the reducing system 14, and/or the discharge system 16 may be transported together on a singular frame 22. Alternatively, infeed system 12 and/or the discharge system 16 may be modular and transported separately from the reducing system 14.

The discharge system 16 may comprise a discharge conveyor 32 (shown without the belt). In an exemplary embodiment, the discharge conveyor 32 may direct material at 280-460 feet per minute with an approximate stacking height of 12 feet 5 inches. The discharge conveyor 32 may comprise a length of 18 feet and a width of 4 feet. A hydraulic thrower (not shown) may be optionally mounted at the end of the discharge conveyor 32 and configured to load end-opening vehicles and/or broadcast the reduced material over a site. An exemplary hydraulic thrower may provide 25 degrees of side-to-side articulation, 34 degrees of upward articulation, and 12 degrees of downward articulation to control directional placement of the reduced waste material discharged from the discharge conveyor 32. In another exemplary embodiment, the discharge conveyor 32 may comprise a length of 27½ feet and a width of 4 feet. The discharge conveyor 32 may itself be articulable and provide 20-32 degrees of upward articulation to provide a maximum stacking height of 15 feet. In yet another example, a swinging or pivoting discharge system may comprise primary and secondary discharge segments articulable relative to one another. The secondary discharge pivots side-to-side 45 degrees with a maximum stacking height of 17 feet 6 inches. The primary and secondary discharge segments may provide for a "folded" configuration for storage, and extend to 30 feet in length. The system may further comprise a magnetic head pulley with support from an additional axle. The magnetic head pulley may be located at the end of the secondary discharge segment for retrieving metal fragments such as nails from the discharged waste material. The swinging or pivoting discharge system may be remotely controlled by radio remote controller.

Figure 2:
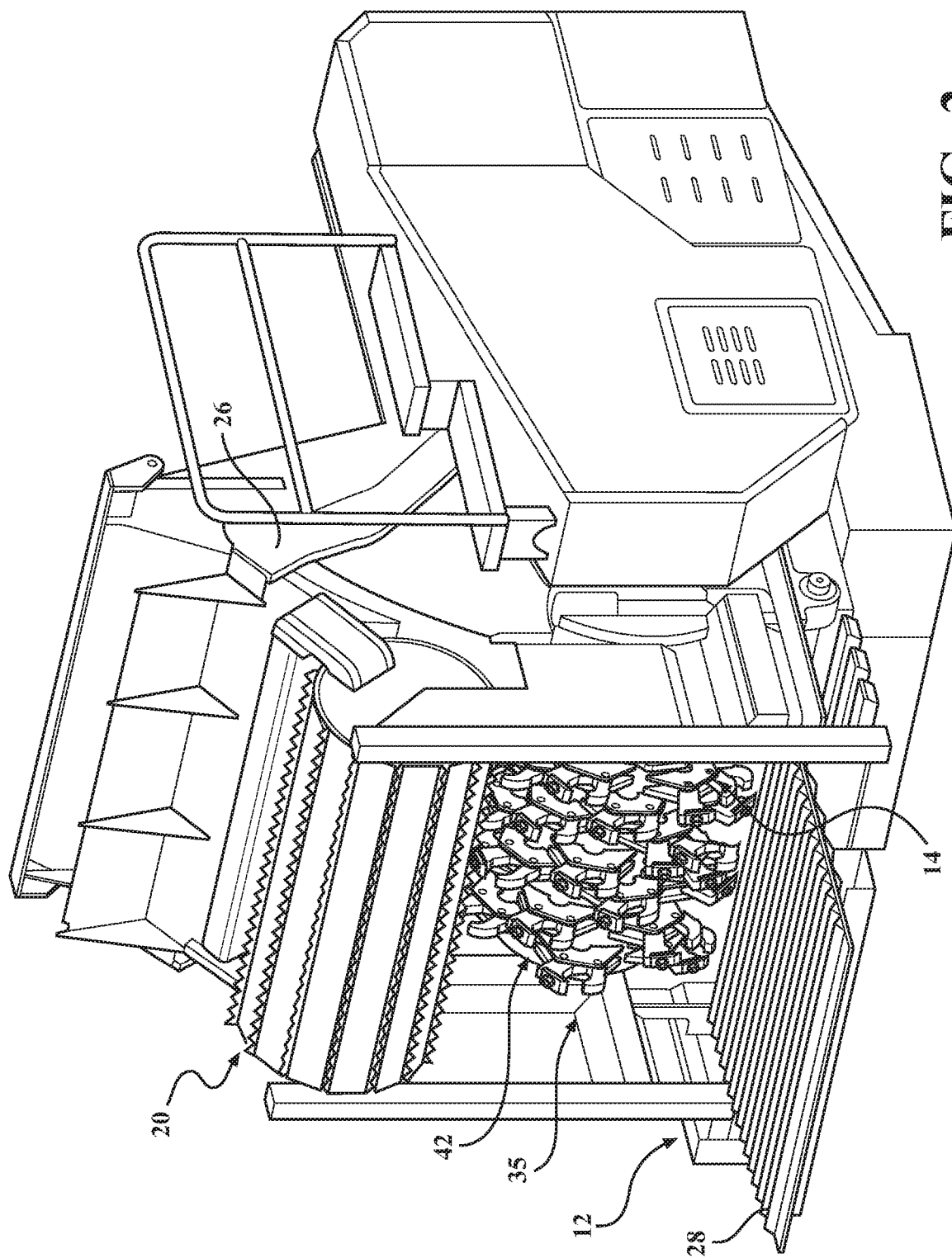
FIG. 2 is a partial perspective view of the material processing machine of FIG. 1 showing portions of an infeed system and a reducing system.

FIG. 2 is a partial perspective view of FIG. 1 illustrating portions of the infeed system 12 and the reducing system 14 supported by the frame 22 of the material processing machine 10. The infeed system 12 further comprises a feed conveyor 28 configured to receive the waste material proximate and direct the waste material towards the feed wheel 20. The feed conveyor 28 and the feed wheel 20 may cooperatively direct the material through an inlet opening 35 towards the reducing system 14. The feed wheel 20 may be internally driven and floating with a diameter of 24" and a width of 60". An exemplary feed conveyor 28 may comprise a double slat track-type design configured to direct material at twenty feet per minute. The feed conveyor 28 may comprise a length of 13 feet 6 inches and a width of 60 inches. Other dimensional and operating characteristics of the feed wheel 20 and the feed conveyor 28 are contemplated.

The feed wheel 20 of the infeed system 12 is rotatably mounted to a lower end of a pair of support arms 26 configured to raise and lower the feed wheel 20 with respect to the feed conveyor 28. The space between the feed conveyor 28 and the feed wheel 20 may generally define an inlet opening 35. FIG. 2 shows one of the support arms 26 (other not viewable) and the feed wheel 20 articulated or pivoted to a generally elevated position thereby providing a relatively larger inlet opening 35 of the infeed system 12. The support arms 26 may be articulated or pivoted to the generally elevated position for inspecting the reducing system 14, for storing the waste processing machine 10, or for accommodating relatively larger material such as a tree trunk. The articulation of the support arms 26 is selectively controlled to position the feed wheel 20 at a desired elevation relative to the feed conveyor 28 to control the size of the inlet opening 35. The articulation may be powered by hydraulic cylinders (not shown) adapted to permit an operator to raise the feed wheel 20 with respect to the feed conveyor 28 through means well understood in the art. The hydraulic cylinders may provide for automatic leveling of the feed wheel 20 if it begins to bind as a result of misalignment of the feed wheel 20 relative to the feed conveyor 28. One or more motors (not shown) operably power the feed conveyor 28 in a generally clockwise direction to move the waste material disposed thereon towards the reducing system 14.

Figure 3:
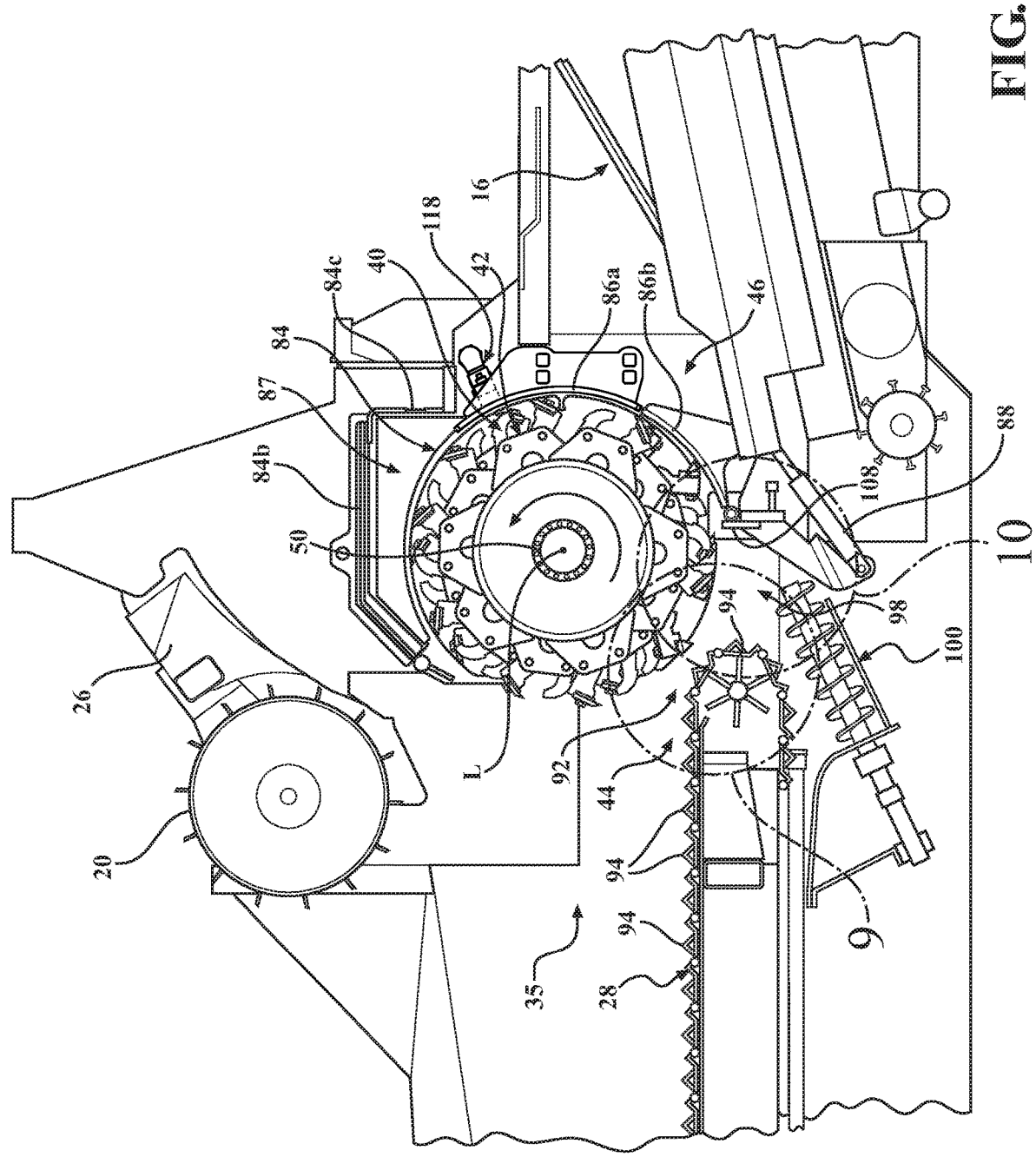
FIG. 3 is a partial cross sectional view of the material processing machine of FIG. 1.
Figure 4:
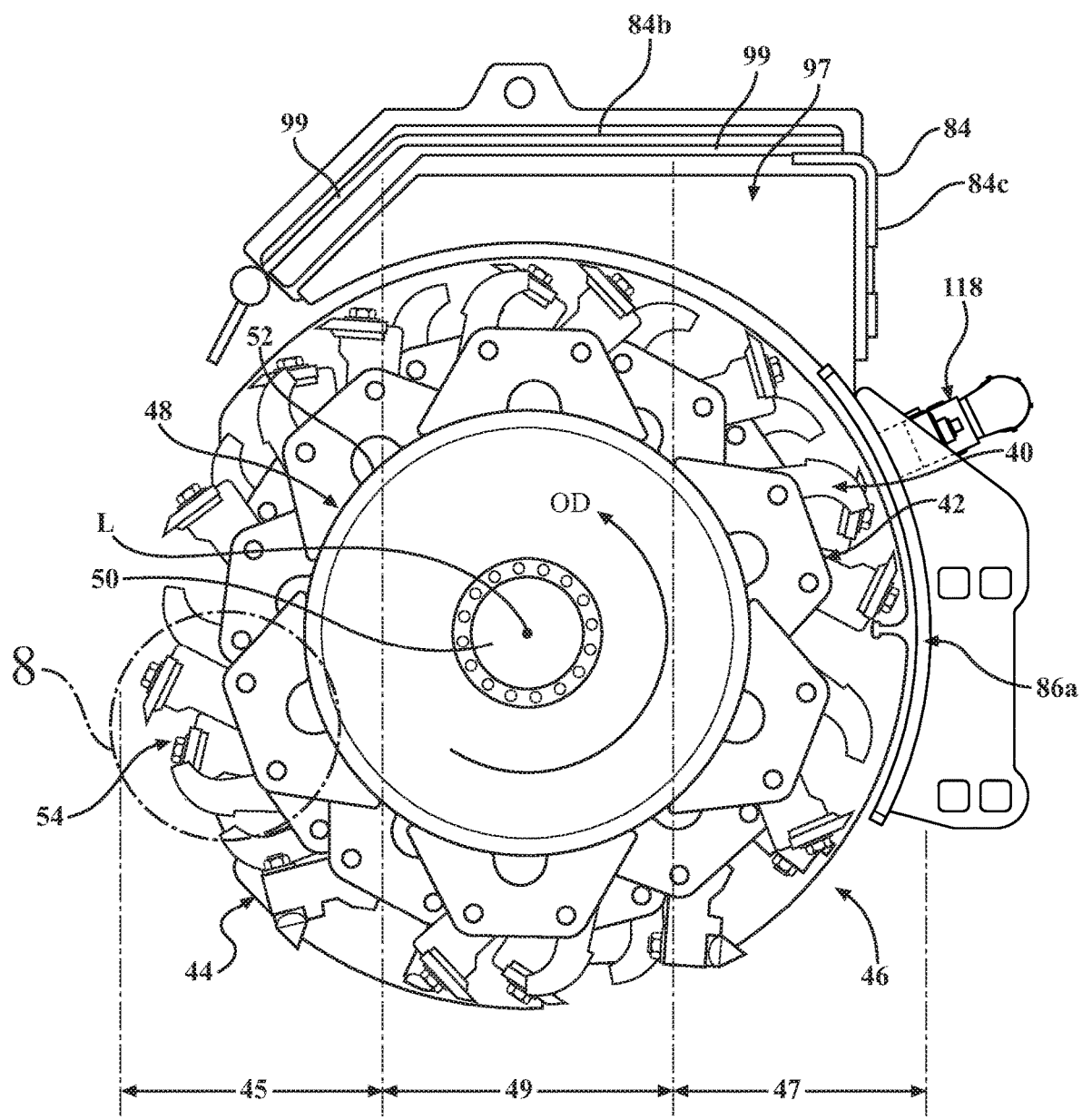
FIG. 4 is cross sectional side elevation view of a reducing chamber of the material processing machine of FIG. 1.

Referring to FIGS. 3 and 4, the reducing system 14 comprises a reducing chamber 40 generally defined as an area of the material processing machine 10 within which material is reduced and that houses a material reducing system 42. The material reducing system 42 comprises a rotor 48 having a shaft 50 rotatably mounted at its ends about longitudinal axis L. The rotor 48 is coupled to the frame 22. The reducing chamber 40 comprises an inlet area 44 and an outlet area 46. In one embodiment, the reducing chamber 40 is a partially cylindrical. The inlet area 44 is generally defined as the area or opening through which the waste material enters the reducing chamber 40 from the infeed system 12. The inlet area 44 of the reducing chamber 40 generally corresponds to the inlet opening 35 of the infeed system 12 such that waste material directed into the inlet opening 35 is further directed into the inlet area 44.

Referring to FIG. 4, the reducing chamber 40 is shown as comprising an inlet zone 45, an outlet zone 47, and a transition zone 49 intermediate the inlet zone 45 and the outlet zone 47. The inlet zone 45 may comprise the inlet area 44, and the outlet zone 47 may comprise the outlet area 46. The functionality of the zones and areas as it relates to the material reducing system 42 and the colorizer system 110 will be described in detail below.

Figure 5:
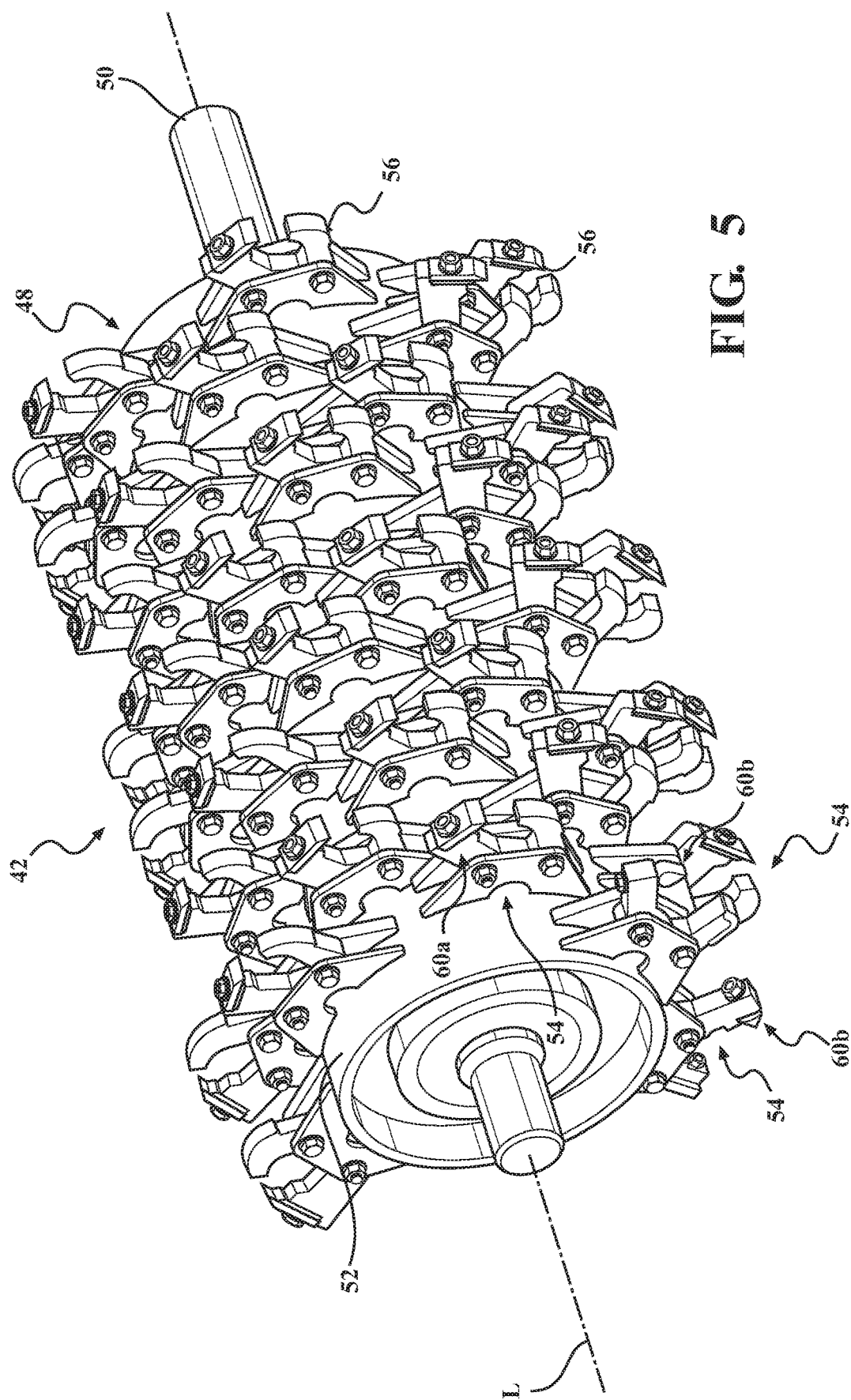
FIG. 5 a perspective view of a material reducing system in accordance with an exemplary embodiment of the present disclosure.

An exemplary material reducing system 42 will now be described with reference to FIG. 5. The rotor 48 has a drum defining an outer surface 52 coaxially disposed with the shaft 50. An exemplary drum may comprise a diameter of 48 inches and a width of 63 inches. For material processing machines 10 with more demanding operating conditions, the drum may comprise a larger diameter and be of a greater or lesser width. A motor (not shown) is connected to the shaft 50 in a well-known manner and adapted to turn the shaft 50 and the rotor 48 in an operating direction OD (FIG. 4), or the direction in which the rotor 48 and shaft 50 rotates.

The rotor 48 has a plurality of processing tool assemblies 54 extending outwardly from the outer surface 52. The material reducing system 42 may comprise forty-two, fifty-four, sixty, seventy-two, or any number of processing tool assemblies 54. The present disclosure contemplates that the processing tool assemblies 54 may be arranged on the outer surface 52 in any number of desired configurations. For example, the processing tool assemblies 54 may be arranged in a generally spiral configuration between the opposing ends of the drum. Among other advantages, the spiral configuration may similarly optimize coverage of the processing tool assemblies 54 about the drum to limit abrasion of the material on the drum and promote a smoother, shaving-style cutting operation. Further, the spiral configuration may urge the reduced material towards a center (i.e., generally intermediate the opposing ends) of the drum to concentrate the processed material. Directing the reduced material towards the center may improve operations such as mulching and prevent debris from encroaching on bearings of the shaft 50. The processing tool assemblies 54 may be arranged in any advantageous manner based on the application or otherwise.

Figure 6A:
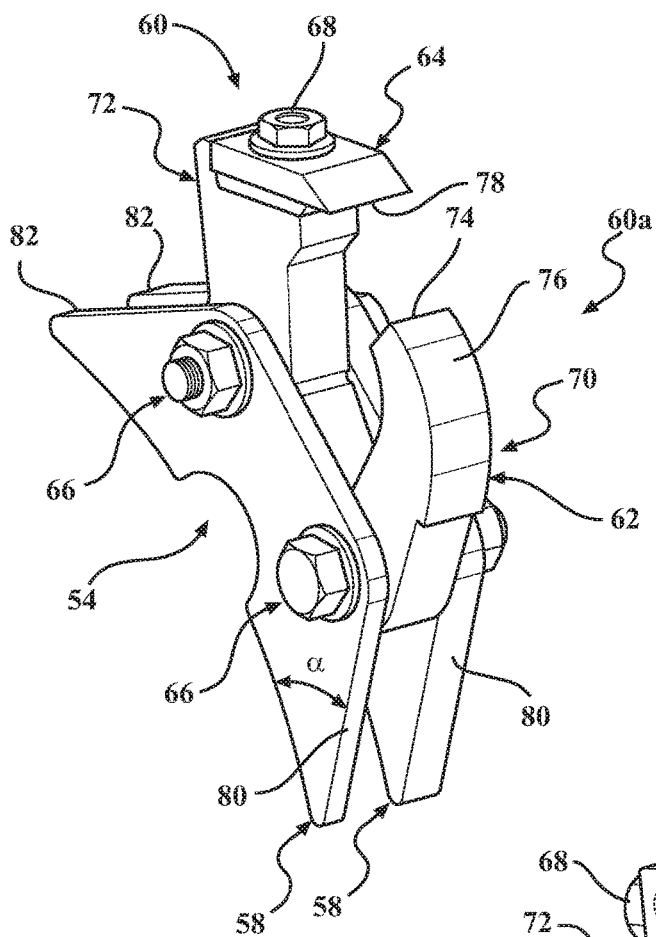
FIG. 6A is a perspective view of a processing tool system in accordance with an exemplary embodiment of the present disclosure.
Figure 6B:
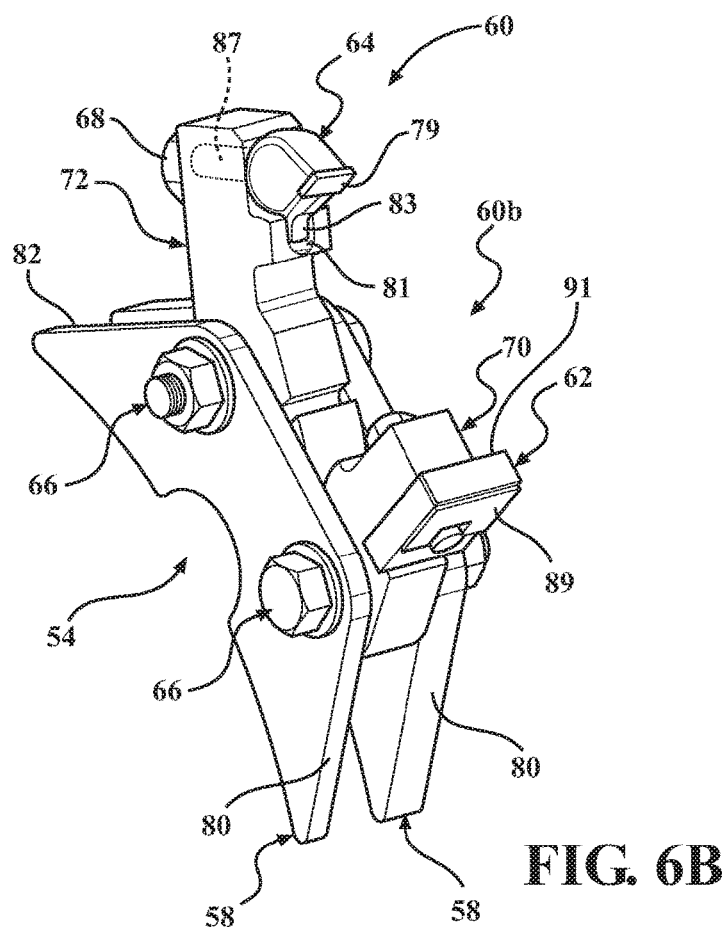
FIG. 6B is a perspective view of a processing tool system in accordance with another exemplary embodiment of the present disclosure.

The processing tool assemblies 54 each comprise a tool holder 56 configured to be fixedly mounted on the outer surface 52 of the drum, and a processing tool 60 coupled to the tool holder 56. An exemplary processing tool assembly 54 is shown in FIGS. 6A and 6B. Each tool holder 56 may comprise a plurality of spaced arm pairs 58 securing the processing tool 60 that cuts, splits, chops, chips, grinds, or any combination thereof, to reduce the waste material provided to the reducing system 14 by the infeed system 12. For example, the processing tool 60 may include a cuttermill 60a, a plate-shaped structure tapering to a leading edge 78, that positions and reduces the material through a decisive splitting action similar to an axe. In an embodiment, the processing tools 60 comprising cuttermills may be associated with less vibration, less fuel consumption, and more structural integrity than machines with comparatively more weight and horsepower. Another exemplary processing tool 60 includes a grinder 60b comprises a tooth-shaped structure with an impact face 79 that reduces the material through a violent impact action. In many operations, only one type of processing tool assembly 54 (e.g., grinders 60b) is incorporated. As illustrated in FIG. 5, the present disclosure contemplates that more than one type of processing tools 60 may be incorporated to produce uniform or non-uniform material with consistent or varying sizes. It is further contemplated the rotor 48 may be arranged in a drum-type material reducing system (i.e., a "drum chipper").

The spaced arm pairs 58 are preferably mounted so that in one rotation of the rotor 48, every point on an imaginary axial line segment along the rotor 48 is contacted by the processing tools 60 mounted to the spaced arm pairs 58 of the tool holder 56. The arm pairs 58 may comprise an angled leading edge 80 and/or an angled trailing edge 82. Each of the arm pairs 58 comprising the angled leading edge 80 and the angled trailing edge 82 may define a generally trapezoidal tool holder 56 when viewed in elevation. The angled leading edge 80 is preferably provided at an acute angle, α. The angle, α, may be between 25 and 75 degrees, or more particularly between 35 and 65 degrees. The angled leading edge 80 directs the material towards the leading member 70 of the processing tool 60, thereby reducing wear on the tool holder 56 and improving efficiency.

The material reducing system 42, and more specifically the processing tool assemblies 54, comprise the processing tools 60 removably coupled to the tool holder 56 with one or more fasteners 66. The fastener 66 may comprise a standard Hex bolt and nut commonly known in the art to facilitate easier service and replacement. The fasteners 66 may prevent movement of the tool body 62 relative to the tool holder 56 during operation of the rotor 48. Other variations of the processing tool assemblies 54 are contemplated, including those disclosed in commonly owned U.S. Pat. No. 6,299,082 to Smith, filed on May 1, 1998, which is herein incorporated by reference in its entirety.

With continued reference to FIGS. 6A and 6B, the processing tool 60 comprises a tool body 62 and a reducing member 64 coupled to the tool body 62. The tool body 62 may comprise a leading member 70 and a trailing member 72. The leading member 70 is generally oriented towards the operating direction OD (FIG. 4). The trailing member 72 is generally oriented a direction opposite the leading member 70 or away from the operating direction OD as shown in FIG. 5. The leading member 70 and the trailing member 72 may be unitary or monolithic in construction. Alternatively, one or more of the leading member 70 and the trailing member 72 may be discrete structures coupled to one another to comprise the tool body 62. In the exemplary embodiment illustrated in FIGS. 6A and 6B, each of the leading member 70 and the trailing member 72 is an elongate, arm-like structure generally extending angularly upward from the tool holder 56.

The reducing member 64 may be coupled to the trailing member 72 as illustrated in FIGS. 6A and 6B. FIG. 6A shows the reducing member 64 generally positioned in mating abutment atop the trailing member 72 and secured with the additional fastener 68 as illustrated. The embodiment illustrated in FIG. 6B shows the trailing member 72 comprising an passage within which a shaft 87 of the reducing member 64 is positioned. A head 89 of the reducing member 64 extends from the trailing member 72 in the operating direction OD. The trailing member 72 may comprise a slot 81 configured to receive a counterposing protrusion 83 extending radially from the tooth-shaped reducing member 64. The engagement of the protrusion 83 within the slot 81 prevents rotation of the reducing member 64 within the trailing member 72 of the tool body 62.

The leading member 70 of the tool body 62 acts as a depth guide to limit the area of a reducing member 64 of the tool body 62 exposed to the waste product being processed. An upper edge 74 of the leading member 70 extends from the tool holder 56 at a distance less than the reducing member 64. The difference in the distances defines a contact area or portion of the reducing member 64 that contacts the waste material being processed. In one exemplary embodiment, the distance is approximately one-half inch, and preferably less than one inch to promote efficient operation (e.g., lesser power requirements, reduced wedging or binding, etc.). However, the distance comprising the depth guide can be increased or decreased depending upon the material being processed and/or any other number of desired operating characteristics.

FIG. 6A shows the leading member 70 comprising an arcuate portion 76 proximate the upper edge 74. The arcuate portion 76 is generally oriented towards the reducing member 64. In one exemplary embodiment, a tangent to the arcuate portion 76 at the upper edge 74 is collinear with the leading edge 78 of the reducing member 64. The arcuate portion 76 is configured to direct the material towards the leading edge 78. The arcuate portion 76 further limits the waste material contacting the trailing member 72 that may detrimentally affect operation. The exemplary embodiment of FIG. 6B includes a leading impact member 91. The leading impact member 91 may be fabricated, at least in part, from carbide. The leading impact member 91 may facilitate reduction of material and/or minimize irreducible material from impacting the reducing member 64.

In many respects, the reducing member 64 is the primary component of the processing tool assembly 54 that directly reduces the waste material. The reducing member 64 is fabricated from suitable material and in a suitable shape so as to chip, cut, grind, shred, pulverize or otherwise reduce the material. Those having skill in the art readily appreciate the reducing member 64 is typically fabricated, at least in part, from carbide to meet the demands of the reducing operation; however other sufficiently hard and/or hardened materials are contemplated. An additional fastener 68 may couple the reducing member 64 and the tool body.

FIGS. 7A-7D illustrate embodiments of the reducing member 64 configured to removably couple to the tool body 62 of FIG. 6B. Each of the reducing members 64 comprise the shaft 87 and the head 89. Typically the shaft 87 and the head 89 are unitary or monolithic in construction. The impact face 79 is secured to the head 89 through welding, brazing or other similar means commonly known in the art. The protrusion 83 previously described extends radially from the head 89 as illustrated.

Figure 7A:
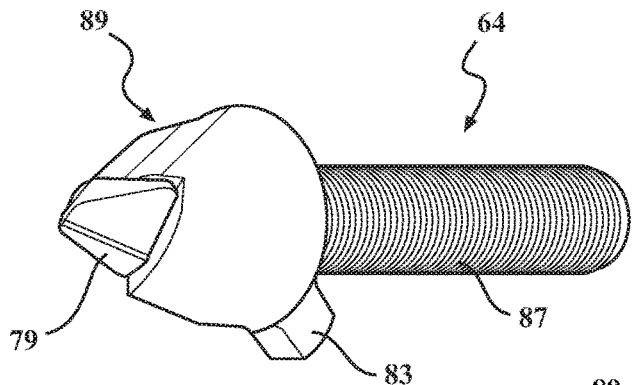
FIG. 7A is a perspective view of a reducing member in accordance with an exemplary embodiment of the present disclosure.
Figure 7B:
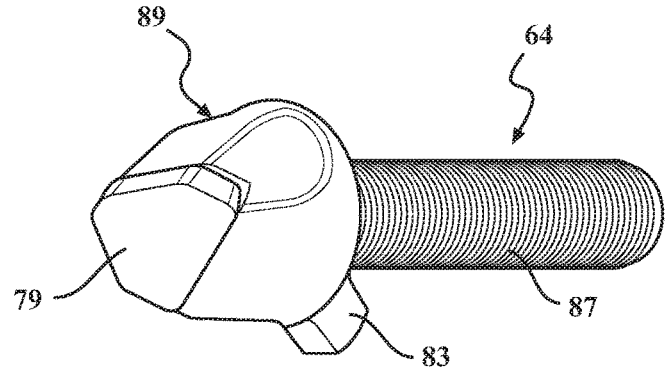
FIG. 7B is a perspective view of a reducing member in accordance with another exemplary embodiment of the present disclosure.
Figure 7C:
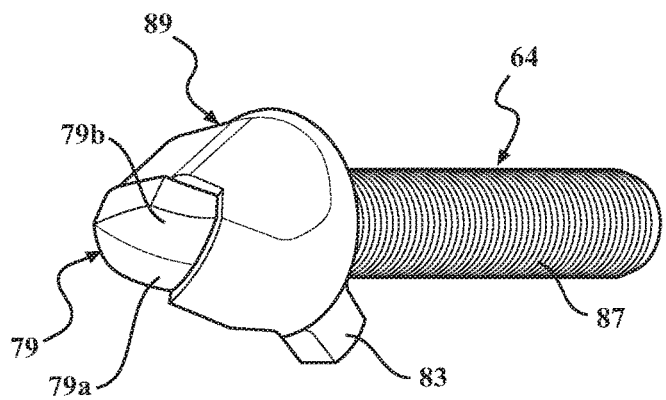
FIG. 7C is a perspective view of a reducing member in accordance with another exemplary embodiment of the present disclosure.
Figure 7D:
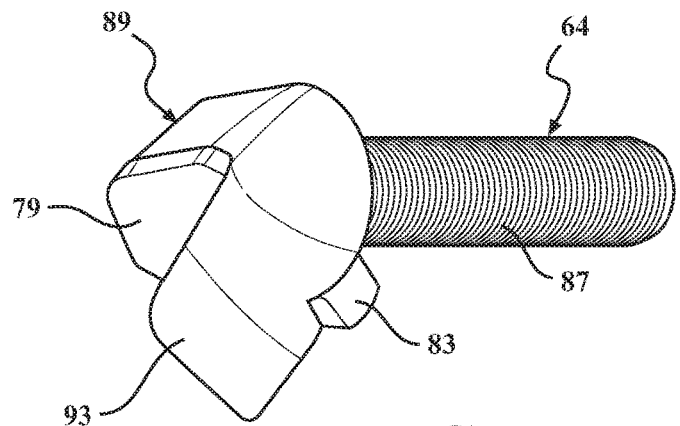
FIG. 7D is a perspective view of a reducing member in accordance with another exemplary embodiment of the present disclosure.
Figure 8:
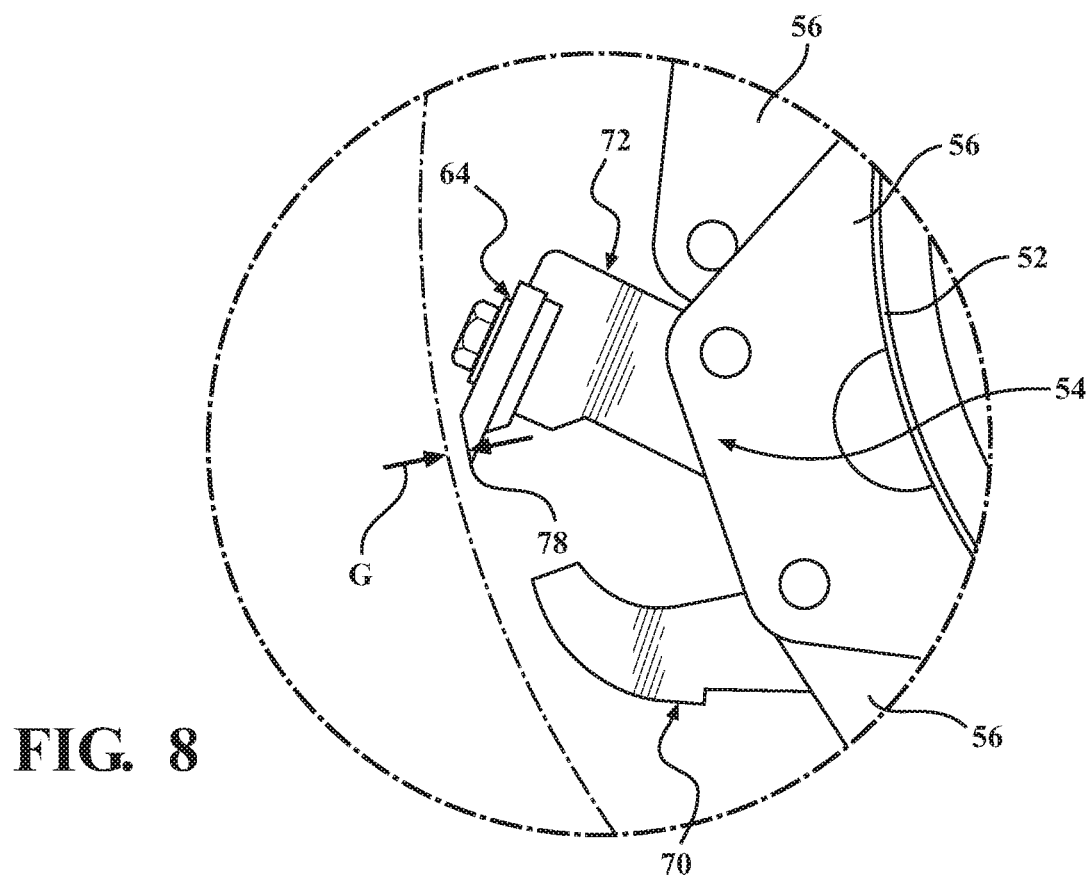
FIG. 8 is a detailed view of section 8 of FIG. 4.

The design of the reducing members 64 of FIGS. 6B and 7A-7D, and more particularly the impact face 79, provides characteristics unique to each reducing member 64. Selection of the suitable reducing member 64, typically based on the reducing operation, maximizes efficiency of the reducing operation. FIG. 7A shows a "splitter tooth" grinder used in many applications, particularly land clearing operations. The splitter tooth may be used with carbide cutters, butcher teeth, or G55 grinding teeth. FIG. 7B shows a "shingle tooth" grinder with a thicker carbide impact face 79. The shingle tooth is durable and particularly effective in reducing shingles and grinding typical green waste. FIG. 7C shows a "helmet head tooth" grinder with a rounded-shaped impact face 79 that is split into two sub-faces 79a, 79b angularly oriented relative to one another. The helmet head tooth is particularly effective in reducing pallets and construction waste as well as light green waste, logging slash, and sawmill waste. FIG. 7D shows a "butcher fan tooth" grinder with a wider impact face 79. The butcher fan tooth also comprises a fan blade 93 forged with the head 89 of the reducing member 64. The fan blade 93 increases fluid forces within the reducing chamber 40, particularly at the boundary, as described in detail throughout the present disclosure. The aforementioned reducing members 64 provide modularity for reducing material to a desired consistency, including bio-sawdust, plastic pallets, compost, conventional chips, cedar mulch, land clearing waste, and pallet waste, among others.

Figure 9:
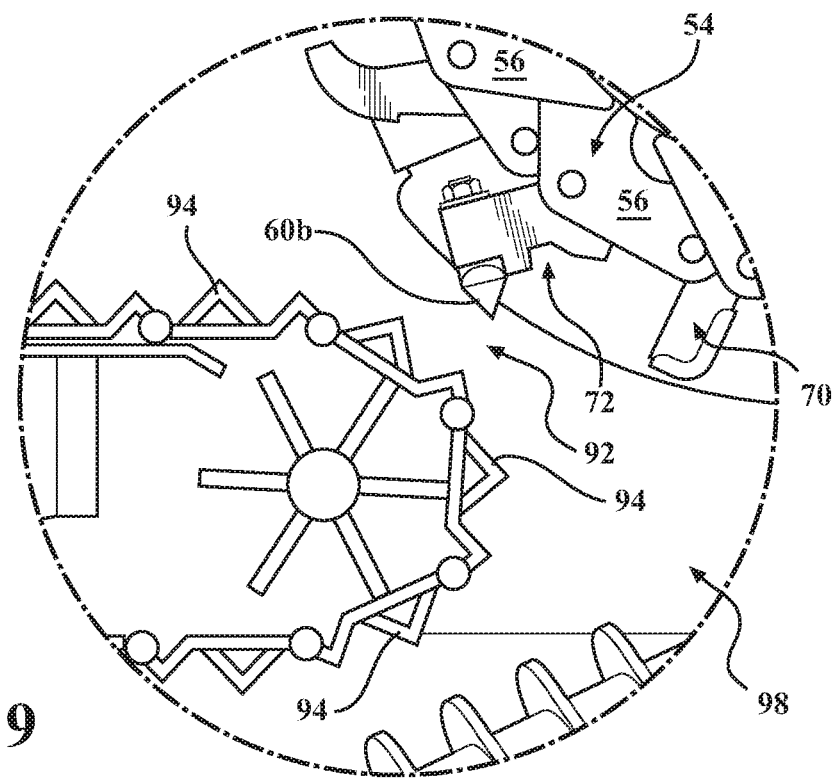
FIG. 9 is a detailed view of section 9 of FIG. 3.

Now returning to the reducing chamber 40 illustrated in FIGS. 3 and 4, the reducing system 14 comprises a housing 84 and one or more screens 86 that at least partially encircle the rotor 48 and define a boundary of the reducing chamber 40. The housing 84 may include barriers 84b, 84c and/or the screen(s) 86 may be arcuate with a radius of curvature approximate the rotor 48 such that at least a portion of the reducing chamber 40 is substantially coaxial to the rotor 48 when viewed in elevation (e.g., the detailed view of FIG. 9 shows the reducing member 64, including the edge 78, separated from the radius of curvature (broken line) by a gap G). The present disclosure contemplates that the gap G may be selectively adjustable based on the size and/or type of processing tool assemblies 54 coupled to the rotor 48. Only a portion of the processing tool assemblies 54 are shown assembled in the figures, and it should be appreciated that the gap G generally extends about the rotor 48.

The housing 84 may define other characteristics of the reducing chamber 40, such as side barriers. For another example, barriers 84b, 84c of the housing 84 generally define an upper recess 97 within the reducing chamber 40. The upper recess 97 may be positioned intermediate the inlet area 44 and the outlet area 46, and more particularly within the transition zone 49 and/or the outlet zone 47 as illustrated in FIG. 4. The upper recess 97 is configured to provide an area of clearance between the processing tool assemblies 54 and the boundary of the reducing chamber 40. Based on the relatively narrow gap G about the rotor 48 at certain points within the reducing chamber 40, and the reducing member 64 of the processing tool assemblies 54, the forces provided by the laminar flow at the boundary caused by centripetal fluid forces are typically significant. The unreduced, partially reduced and fully reduced material may similarly occupy the gap G between the inlet area 44 and the outlet area 46. The clearance provided by the upper recess 97 allows expansion of the fluid (e.g., air) within the reducing chamber 40 to minimize a throttling effect at the boundary within the gap G. The clearance may also reduce wear from any material and/or non-reducible objects (e.g., a rock or other hard debris) moving about the boundary in the operating direction OD by limiting the contact between the same. The upper recess 97 provides the area of clearance for non-reducible objects to be temporarily deposited before being directed in the operating direction OD to the inlet zone 45. Due to potential wear proximate the upper recess 97, one or more of the barriers 84b, 84c may be removably secured to provide ease of replacement. For example, the barrier 84b may define a "roof" comprising one or more slats 99 configured to be slidably removed and installed. The slats 99 may be supported at its ends or secured with fasteners as commonly known in the art. Lastly, the upper recess 97 may further provide relief from larger obstructions within the reducing chamber 40 to maintain efficient operation of the reducing system 14.

The boundary of the reducing chamber 40 is at least partially comprised of the screen 86. Referring to the embodiment shown in FIGS. 3 and 4, a fixed screen 86a and a movable screen 86b are shown generally positioned within outlet zone 47 and separate the reducing chamber 40 from the discharge system 16. The fixed screen 86a is positioned above the movable screen 86b, but the reverse configuration is contemplated. In an alternative variant, only one of the screens 86a, 86b may be provided. It is to be appreciated that the fixed screen 86a may be removed from the machine 10, but the position once installed is fixed relative to the reducing chamber 40. The operation of the movable screen 86b will be described in more detail below. The screens 86a, 86b may be arcuate and substantially concentric with the rotor 48. In an exemplary embodiment, the screens 86a, 86b are separated from the processing tool assemblies 54 by the gap G. The gap G is preferably small such that the potential for the screens 86a, 86b to facilitate further reduction of the material is insignificant. Stated differently, an insignificant amount of material is further reduced by edges of the openings of the screens 86a, 86b. Rather, the screens 86a, 86b permit the waste material to exit the reducing chamber 40 once sufficiently reduced.

The movable screen 86b may also be removed from the machine 10, but the movable screen 86b is pivotally mounted and may be pivoted with one or more hydraulic cylinders 88. In an event that a non-reducible object becomes entrapped within the reducing system 14, the hydraulic cylinders 88 pivot the screen 86b downwardly, thereby creating access spanning substantially the width of the rotor 48. Should this be done while the rotor 48 continues to operate, the non-reducible object may eject automatically. Alternatively, the rotor 48 may be powered down and the non-reducible object manually removed from the reducing chamber 40 via the access. In the former instance, an advantage of the movable screen 86b permits clearing of non-reducible objects from the reducing chamber 40 without stopping operation of the rotor 48.

Reducing operations of the waste processing machine 10 will now be discussed. As previously described, the feed conveyor 28 operates in a generally clockwise direction to direct the waste material disposed thereon towards the reducing chamber 40. The feed wheel 20 may further facilitate with such directing. The material passes through the inlet opening 35 of the infeed system 12 and the inlet area 44 of the reducing chamber 40. Referring now to FIGS. 3, 4, and 9, the waste material reaches a terminal end 92 of the feed conveyor 28. As mentioned, the feed conveyor 28 is a track comprised of slats 94. The slats 94 are designed to withstand the demands of the reducing operation. In one example, each of the slats 94 comprises a hardened upper portion of carbide, steel, or other suitably hard and durable material.

The terminal end 92 of the feed conveyor 28 is positioned sufficiently proximate to the path of the processing tool assemblies 54 of the rotor 48 such that the material is reduced by the processing tool assemblies 54 against the slats 94, thereby further defining the material reducing system 42. In other words, the material reducing system 42 includes the portion of the slats 94 that interface with the processing tool assemblies 54 of the rotor 48. With particular reference to FIGS. 3 and 9, the waste material is reduced effectively contemporaneous with "leaving" the feed conveyor 28. Reducing the material directly against the slats 94 eliminates the need for an anvil commonly known in the art, and advantageously eliminates any area or volume between the feed conveyor 28 and such an anvil for material to collect and wedge. FIG. 4 generally shows that the material reduction first occurs in the inlet zone 45 with the rotor 48 having the counterclockwise operating direction OD.

Figure 10:
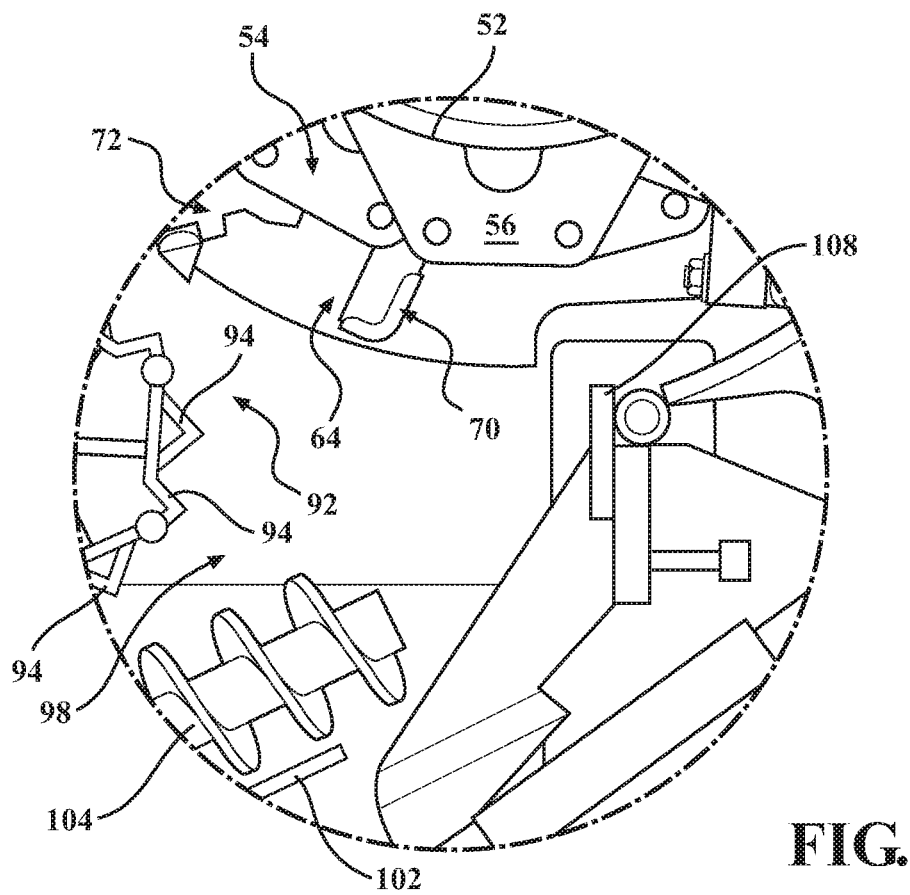
FIG. 10 is a detailed view of section 10 of FIG. 3.

In a preferred embodiment, the reducing operation comprises more than one point of material reduction, also referred to herein as a "hit point." The hit point is a point in the material reducing operation in which material reduction occurs. The first hit point comprises reducing the material with the processing tool assemblies 54 against the slats 94 as previously described. The second hit point may comprise reducing the material with the processing tool assemblies 54 against an anvil 108 positioned between the inlet area 44 and the outlet area 46. Referring to FIG. 10, the anvil 108 provides a surface for the rotor 48 to perform the second hit point. The anvil 108 may extend substantially the width of the reducing chamber 40. The anvil 108 is preferably formed from an exposed wear member removably secured to a support member. With this structure, the wear member can be quickly and easily replaced if damaged by a non-reducible or as a result of wear through operation of the material processing machine 10.

After at least partial reducing at the first hit point, the reduced material is directed in the operating direction OD towards the anvil 108. The forces directing the reduced material may be provided by the laminar flow at the boundary (e.g., centripetal fluid forces), or by the leading member 70 directly impacting previously reduced material. At least a portion of the reduced material contacts an upper portion of the anvil 108 and is furthered reduced by the processing tool assemblies 54 rotating proximate the anvil 108 at significantly high rotational speeds (i.e., revolutions per minute). At least most of the reduced material is directed along the boundary from the inlet zone 45 to the outlet zone 47 towards the screens 86a, 86b. Provided the material is reduced to a small size, the forces direct the sufficiently reduced material through the screens 86a, 86b and to the discharge conveyor 32 of the discharge system 16.

Subsequent to the first hit point, a portion of the at least partially reduced material may be disposed in a basin 98 of an auxiliary feed system 100 comprising a component of the reducing system 14. Referring to FIGS. 3 and 10, the basin 98 generally comprises an area below the reducing chamber 40, or alternatively comprises a lower portion of the reducing chamber 40. The basin 98 may extend the width of the reducing chamber 40. One or more walls 102 may define the basin 98. The basin 98 may receive material that contacts a lower portion of the anvil 108 such that the material does not engage the second hit point, and/or material sufficiently unreduced from the first hit point that gravity forces the material into the basin 98. The basin 98 may also receive minimal bits of material not sufficiently reduced to pass through the screens 86a, 86b, which is directed about the boundary in the operating direction through the transition zone 49 to the inlet zone 45, and potentially further reduced at the first hit point. Regardless of origin, the material within the basin 98 accumulates during operation of the reducing system 14.

The auxiliary feed system 100 further comprise one or more augers 104 positioned inferior to the rotor 48. In a preferred embodiment, the one or more augers 104 is a plurality of augers (one shown in FIGS. 3 and 10) positioned in a side-by-side configuration across the width of the reducing chamber 40. The augers 104 may at least partially extend through the basin 98. In the exemplary embodiment illustrated in FIGS. 3 and 10, the augers 104 are oriented angularly and proximate to the wall 102 defining the basin 98. The augers 104 are powered by a motor and configured to direct material from a lower portion of the basin 98 to an upper portion of the basin 98.

With reference to FIG. 10, the auxiliary feed system 100 further comprises the anvil 108 positioned adjacent the basin 98 proximate the rotor 48. The anvil 108 is configured to facilitate a second reducing operation (as well as defining the second hit point of a first reducing operation). The accumulated material within the basin 98, directed with the rotating augers away from the lower portion of the basin 98 toward the rotor 48 rotating in the operating direction OD. Eventually, accumulated material encroaches the boundary of the rotor 48 such that it is directly impacted by one of the rotating processing tool assemblies 54. The material may be further reduced by the reducing member 64 of the processing tool 60. The anvil 108 provides a surface to constrain the material within the basin 98 to further facilitate an efficient second reducing operation. The further reduced material may be sufficiently small to pass through the screens 86a, 86b, or alternatively directed around the boundary of the reducing chamber 40 to be deposited in the basin 98 for yet another reducing operation against the anvil 108. Once the material has been reduced and expelled from the reducing system 14, the discharge conveyor 32 of the discharge system 16 directs the waste products to the appropriate location for stacking, storage, shipping, or other desired processing.

The structure of the material reducing system 42 in combination with the auxiliary feed system 100 provides a system that quickly and efficiently reduces the material to the desired particle size and then discharges these particles quickly and efficiently from the reducing system 14. The system further includes means for varying the system, allowing for customization of the processing, depending upon the application. For example, the spacing between the processing tools 60 and the slats 94 and/or anvil 108 may be varied.

Figure 11:
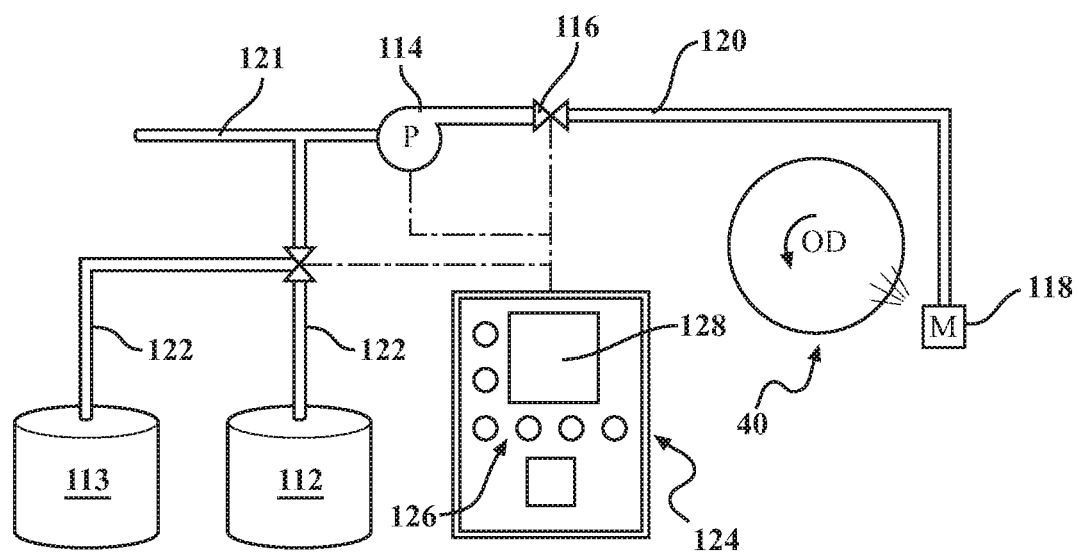
FIG. 11 is a schematic representation of a colorizer system in accordance with an exemplary embodiment of the present disclosure.
Figure 12:
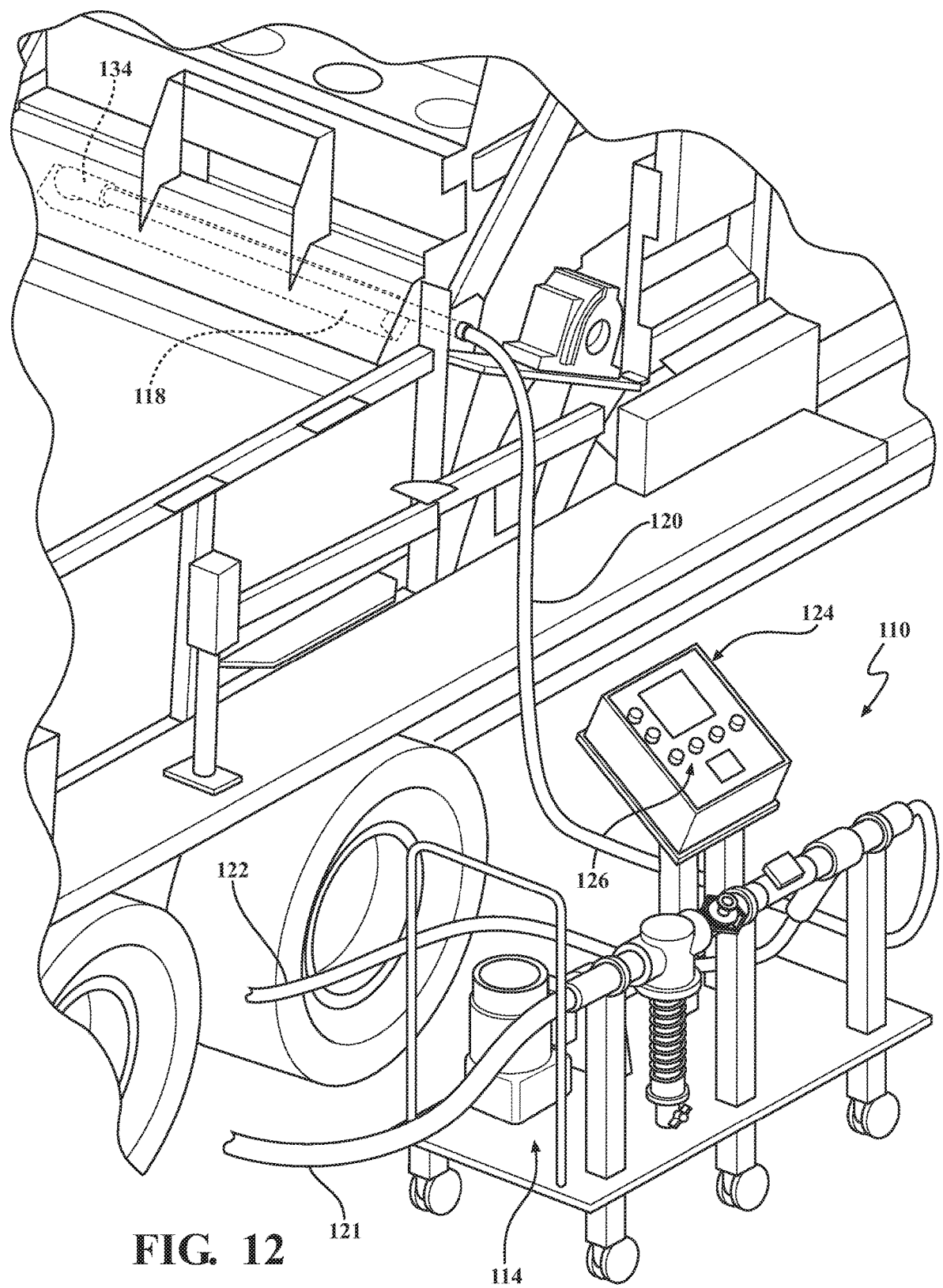
FIG. 12 is a perspective view of the colorizer system of FIG. 1 positioned near the material processing machine.

As mentioned, it may be desirable to apply a colorant to the reduced waste material for aesthetics, mold prevention, and the like. To that end, the waste processing machine 10 comprises the colorizer system 110. FIG. 11 shows a schematic representation of one portion of an exemplary colorizer system 110 comprising a colorant source 113, one or more pumps 114, one or more valves 116, and one or more manifolds 118. Line 121 is provided and coupled to a fluid source, such as a water reservoir. The lines 120, 121, 122 may be flexible tubing, rigid piping, or any other suitably constructed conduit. FIG. 12 shows several components of the colorizer system 110 coupled to a movable cart-like structure positioned near and coupled to the waste processing machine 10 with one of the lines 120, 121, 122. Another embodiment of the colorizer system may include the screen 86, one or more pumps 114, and one or more manifolds 118. In such an embodiment, the colorizer system can be retrofitted into existing material processing machines 10.

The colorant may be liquid, granular, or powdered, or combinations thereof. In one embodiment, the colorant source 113 is schematically represented as a tank in FIG. 11 configured to store a liquid colorant. Additionally or alternatively, the colorant source 113 may comprise a cartridge configured to store a powdered or granular colorant. The colorant source 113 may include the liquid colorant pre-mixed from a powered colorant concentrate. Any suitable vessel may be included to store the colorant.

The pump 114 is in fluid communication with the colorant source 113 and configured to provide a positive pressure or negative pressure to direct the colorant through the colorizer system 110. The colorant may be pumped in a form substantially as stored in the colorant source 113, and/or mixed with water or another additive. For example, the line 121 in fluid communication with a water reservoir dilutes the colorant to a desired concentration from a concentrated form in the colorant source 113. One of the valves 116 may selectively provide fluid communication between the colorant source 113 and the water reservoir. In another exemplary embodiment, the colorizer system 110 comprises an additive source in selective fluid communication with the manifold 118 with the additive including a fungicide or other chemical composition(s).

The colorizer system 110 may be controlled with a controller 124. The controller may comprise a user interface 126 and an alternating current (AC) drive 128 to control the pump 114. One exemplary AC drive comprises a TECO-Westinghouse Model. No. L510 (Round Rock, Tex.). The controller 124 may further be in electronic communication with and selectively control one or more of the valves 116.

Figure 13:
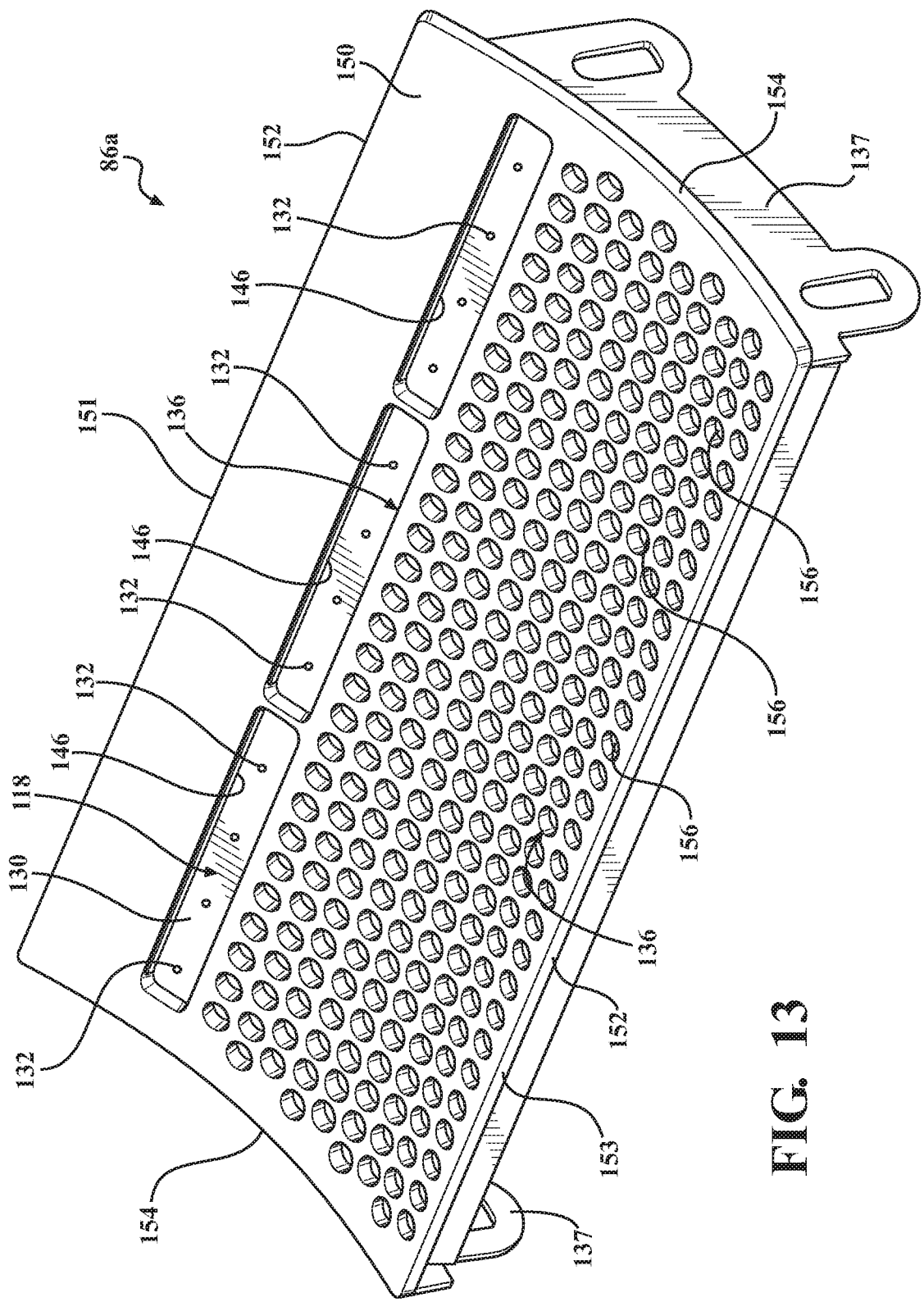
FIG. 13 is a top perspective view of a screen and a manifold of the colorizer system coupled to the screen in accordance with an exemplary embodiment of the present disclosure.

The colorant (and, if desired, the additive(s)) is directed through the lines 120, 121 to the manifold 118. One embodiment of the manifold 118 is shown in FIGS. 13 and 14. The manifold 118 comprises an elongate chamber 130 and a plurality of orifices 132. The elongate chamber 130 may comprise a square or rectangular cross section, as shown, or alternatively a cylindrical, triangular, or other suitable elongate shape. The orifices 132 may be arranged along a length of the elongate chamber 130, and more particularly, equally or unequally spaced along the length of the elongate chamber 130. The manifold 118 further comprises an inlet 134 configured to removably couple to one of the lines 120. In the exemplary embodiment illustrated in FIG. 14, the inlet 134 comprises an opening to removably receive an end of the line 120 through a suitable joining means. In an alternative variant, the inlet 134 comprises a threaded end to removably receive a counterposing threaded end of the line 120. When coupled to the line 120, the elongate chamber 130 is in fluid communication with the colorant source 113 to receive the colorant under pressure provided by the pump 114.

Referring to FIG. 13, one embodiment of the screen 86 is shown having a plurality of apertures 136. As mentioned, the screen 86 may be either the fixed screen 86a or the movable screen 86b. The fixed screen 86a may be arcuate with a radius of curvature approximate the rotor 48 such that at least a portion of the reducing chamber 40 is substantially coaxial to the rotor 48. In particular, the fixed screen 86a may include an arcuate face 150 with a top edge 151 and a bottom edge 153 The arcuate face 150 is defined between opposing lengthwise sides 152 separated by opposing widthwise sides 154 to form a generally rectangular shape with a width generally spanning the width of the reducing chamber 40. The fixed screen 86a shown in FIGS. 13 and 14 includes a pair of brackets 137 extending from the opposing widthwise sides 154 to secure the fixed screen 86a to the housing 84. It is to be understood that any suitable bracketry may be included on the fixed screen 86a to effectuate mounting the fixed screen 86a to the housing 84.

The plurality of apertures 136 of the screen 86 extend through the arcuate face 150. The manifold 118 is disposed adjacent to the screen 86 such that the plurality of orifices 132 align with at least a portion of the apertures 136 for directing the colorant through the screen 86 in a direction of the processing tools 60. When the rotor 48 and the processing tools 60 rotate with the colorant disposed thereon, it provides for substantially contemporaneous reducing of the waste material within the inlet zone 45 and colorizing of the waste material within at least the inlet zone 45.

The plurality of apertures 136 is further defined as comprising at least one channel 146. The channels 146 extend through the arcuate face 150. The embodiment shown in FIGS. 13 and 14 shows three channels 146 as elongate slots extending across substantially an entirety of a width of the reducing chamber 40. The manifold 118 is positioned adjacent the channels 146 to direct the colorant from the orifice 132 through the channels 146.

The plurality of apertures 136 is also defined as comprising a plurality of openings 156 different than the channel 146. The openings 156 may be arranged in any suitable manner and be of any suitable size. In the illustrated embodiment, the openings 156 are arranged in offset rows with each of the openings 156 being circular in shape. Other contemplated shapes for the openings 156 include squares, hexagons, diamonds, and baffles. As shown in the embodiment of FIG. 13, the plurality of openings 156 are adjacent the bottom edge 153 and the at least one channel 146 is positioned above the openings 156 nearer to the top edge 151 relative to the counterclockwise operating direction of the rotor 48 such that the rotation of the rotor 48 in an operating direction provides for substantially an entirety of the waste material colorized and reduced within the inlet zone 45 to pass through the screen 86 to the discharge system.

With continued reference to FIGS. 13 and 14 and further reference to FIGS. 3 and 4, the manifold 118 is positioned adjacent the fixed screen 86a, and more particularly the channels 146 of the fixed screen 86a. In the illustrated embodiment, the manifold 118 is removably mounted to the fixed screen 86a on a rear side opposite the arcuate face 150 such that the orifices 132 of the manifold 118 are positioned to direct the colorant through the channels 146 of the fixed screen 86a. In other words, the orifices 132 of the manifold 118 and the reducing chamber 40 are in fluid communication with one another through the channels 146 of the fixed screen 86a. FIG. 13 shows each of the orifices 132 of the manifold 118 are positioned to direct the colorant through the channels 146 that are rectangular in shape. It is to be appreciated that the manifold 118 may direct the colorant through the openings 156 such that the screen 86 may not include the channels 146. Further, while desirable, each of the orifices 132 are not required to align with the openings 156, which may occur when the manifold 118 is retrofit. The manifold 118 is positioned in sealing engagement about the channels 146 such that the reduced material is prevented from passing through the channels 146. In one embodiment, the manifold 118 is mounted directly to the screen 86. In another embodiment, the manifold 118 may be mounted to the housing 84 instead of the screen 86. It is to be understood that the movable screen 86b may be configured in a manner similar to that of the fixed screen 86a with the manifold 118 mounted to the movable screen 86b. It is further understood that each of the screens 86a, 86b may include a manifold, or alternative only one screen 86a, 86b may be provided.

In one variant, the manifold 118 is coupled to the housing 84 or another suitable structure of the material processing machine 10 (i.e., not mounted to the fixed screen 86a) in a manner to generally orient the elongate chamber 130 with the channels 146 of the fixed screen 86a. In other words, the manifold 118 may be positioned adjacent the fixed screen 86a with a gap between the manifold 118 and the fixed screen 86a. The orifices 132 of the manifold 118 configured to direct the colorant through the fixed screen 86a, such as through the openings 156 or the channels 146, in the fixed screen 86a across the gap. Other suitable configurations between the manifold 118 and the fixed screen 86a are contemplated for integrating the fixed screen 86a as a functional component of the colorizer system 110.

The manifold 118 is positioned proximate the reducing chamber 40. FIGS. 3-5 show the manifold 118 coupled to the fixed screen 86a and positioned external to the reducing chamber 40. With concurrent reference to FIG. 4, it is appreciated that the elongate slots forming the channels 146 are positioned above the openings 156 relative to the counterclockwise operating direction OD of the rotor 48. In other words, the reduced material will first encounter the openings 156, and if sufficiently reduced, pass through the openings 156 into the discharge system 16 prior to passing in front of the channels 146 from which the colorant is being directed toward the rotor 48.

In one example, a mounting system 138 facilitates coupling the manifold 118 to the fixed screen 86a. The mounting system 138 is configured to appropriately position the orifices 132 of the manifold 118 to direct the colorant through the channels 146 of the fixed screen 86a and into the outlet zone 47 of the reducing chamber 40 in a manner to be described. The mounting system 138 is further configured to facilitate ease with servicing and replacement of the manifold 118. The mounting system 138 may include a bracket 139 mounted to the fixed screen 86a, such as through welding or other suitable joining means. The bracket 139 of the illustrated embodiment is L-shaped and positioned adjacent the channels 146. The illustrated embodiment shows three brackets 139, two positioned near the opposing widthwise sides 154 and one positioned proximate a center between the sides 154. The mounting system 138 includes one or more flanges 141 that are preferably mounted to the manifold 118, such as through welding or other suitable joining means. The flanges 141 include holes adapted to be aligned with complimentary holes (not shown) at least partially extending through a collar 168 of the fixed screen 86a extending about the channels 146. In other words, to mount the manifold 118 to the fixed screen 86a, the manifold 118 is nested within the brackets 139 such that the holes of the flanges 141 are aligned with the complimentary holes. Fasteners (not shown), such as bolts and the like, are inserted through the holes to releasably secure the manifold 118 to the bracket 139 with the mounting system 138, thereby providing ease with servicing and replacement of the manifold 118.

With the manifold 118 mounted to the fixed screen 86a in the aforementioned manner, the channels 146 of the fixed screen 86a open into the outlet zone 47 of the reducing chamber 40. The colorant is directed from the orifices 132 of the manifold 118, through the channels 146 and into the outlet zone 47 of the reducing chamber 40. In other words, the colorant may be ejected from the manifold 118 external to the reducing chamber 40, after which it passes through the and into the outlet zone 47. The manifold 118 is mounted to the bracket 139 to align to the orifices 132 of the manifold 118 with the rotor 48. Further, disposing the manifold 118 external to the reducing chamber 40 and directing the colorant through the channels 146 provides for, among other advantages, retrofitting existing waste material machines with the colorizer system 110. The arrangement further facilitates retrofitting existing waste material machines with the colorizer system 110 without the further need of pipes, fittings, and the like, extending between the manifold 118 and the reducing chamber 40.

The manifold 118 is positioned to direct the pressurized colorant towards a portion of the material reducing system 42 and in particular the rotor 48. More specifically, the manifold 118 is positioned to direct the pressurized colorant to coat the processing tool assemblies 54. The angle at which the colorant is directed towards the rotor 48 may be based, at least in part, on a shape of the fixed screen 86*a* and/or mounting system 138. In the illustrated example, the colorant may contact the rotor 48 at approximately between the 2 or 3 o'clock positions.

With further reference back to FIG. 4, the manifold 118 and the first hit point (i.e., where the processing tool assemblies 54 reduces the material against the slats 94) are positioned generally opposite each other about the rotor 48 such that colorant ejected from the manifold is not directly applied to the material entering the reducing chamber. As described herein, the colorant "coats" and travels with the rotor 48 in the operating direction OD, and colorizes the material substantially contemporaneous with the reducing operation. As discussed below, the material entering the reducing chamber has preferably already been reduced at least once.

Figure 15:
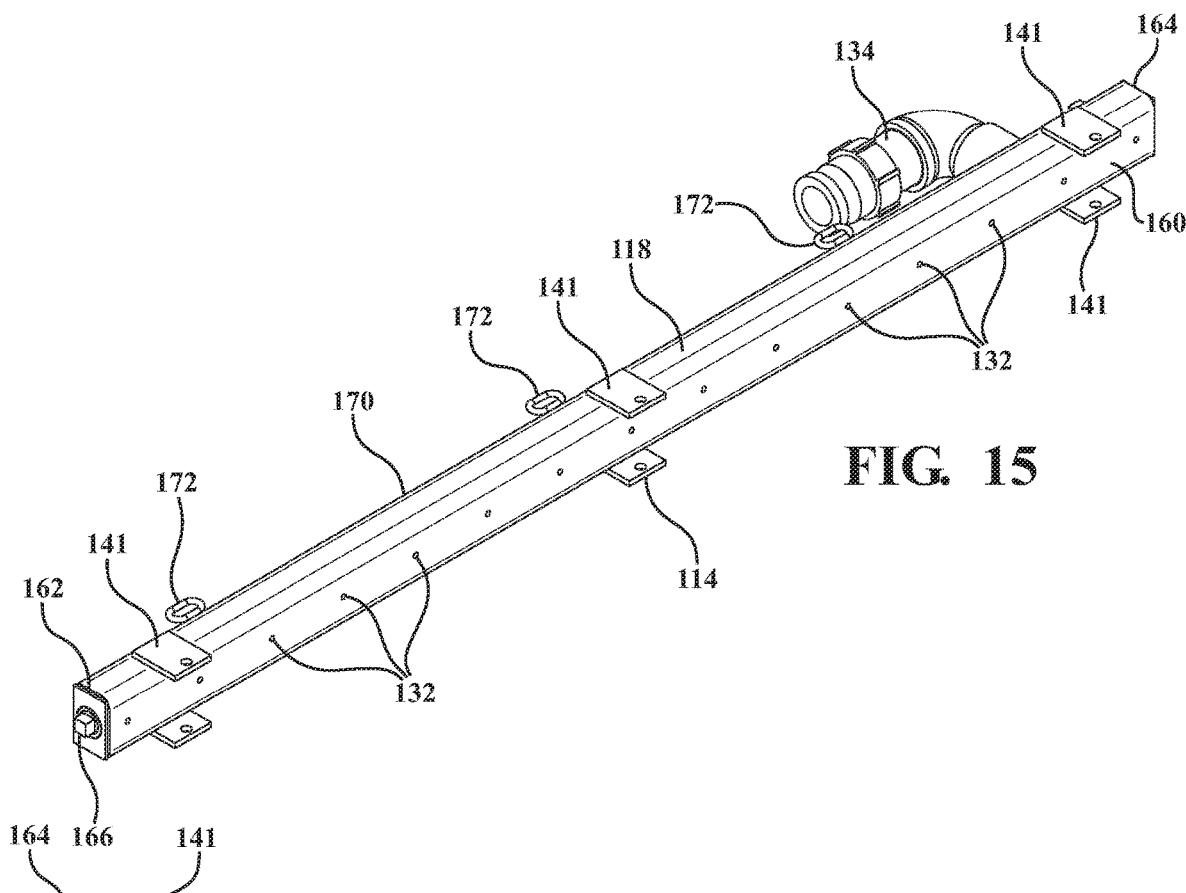
FIG. 15 is a front perspective view of one embodiment of a manifold according to the subject invention.
Figure 16:
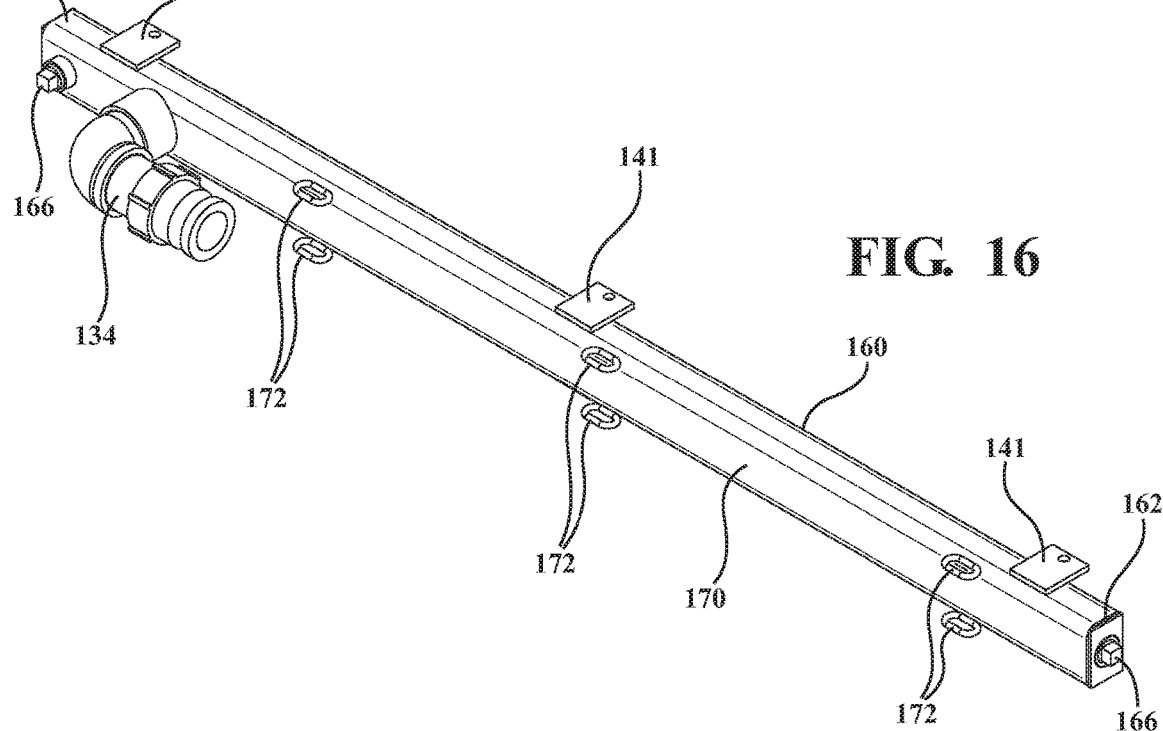
FIG. 16 is a rear perspective view of the manifold shown in FIG. 15.

Referring to FIGS. 15-18, another embodiment of the screen 86 and the manifold 118 are shown. FIG. 15 is a front perspective view of the manifold 118 and FIG. 16 is a rear perspective view of the manifold 118. The orifices 132 are on a front face 160 of the manifold 118. The manifold 118 extends between a first end 162 and a second end 164 and includes a cleanout port 166 disposed near each end 162, 164. The inlet 134 is on a rear face 170 of the manifold. The mounting system 138 includes the flanges 141 that are preferably mounted to the manifold 118, such as through welding or other suitable joining means. A plurality of loops 172 are coupled to the screen 86 for securing the hose 120 to the back of the manifold 118.

Figure 17:
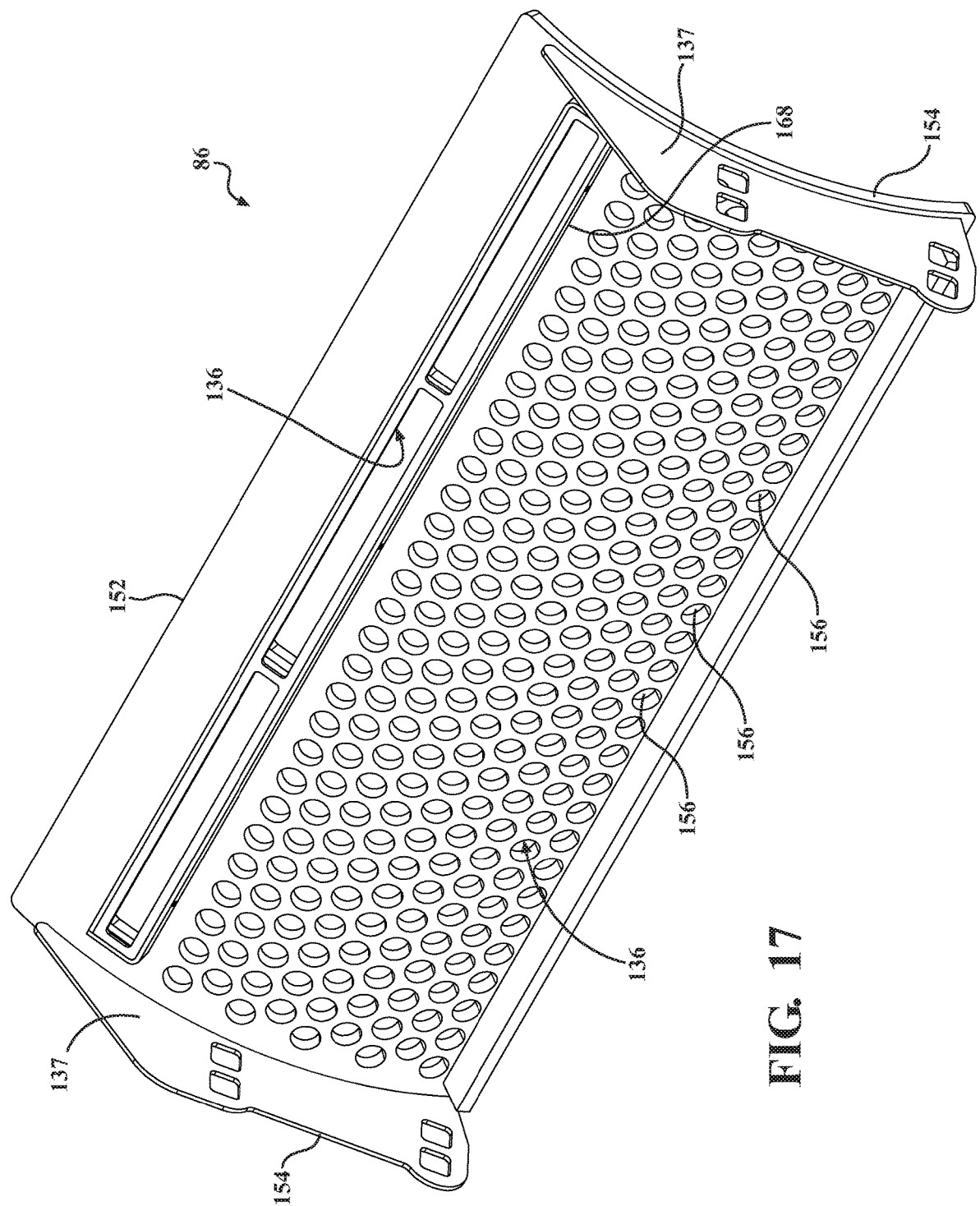
FIG. 17 is a rear perspective view of one embodiment of a screen according to the subject invention.
Figure 18A:
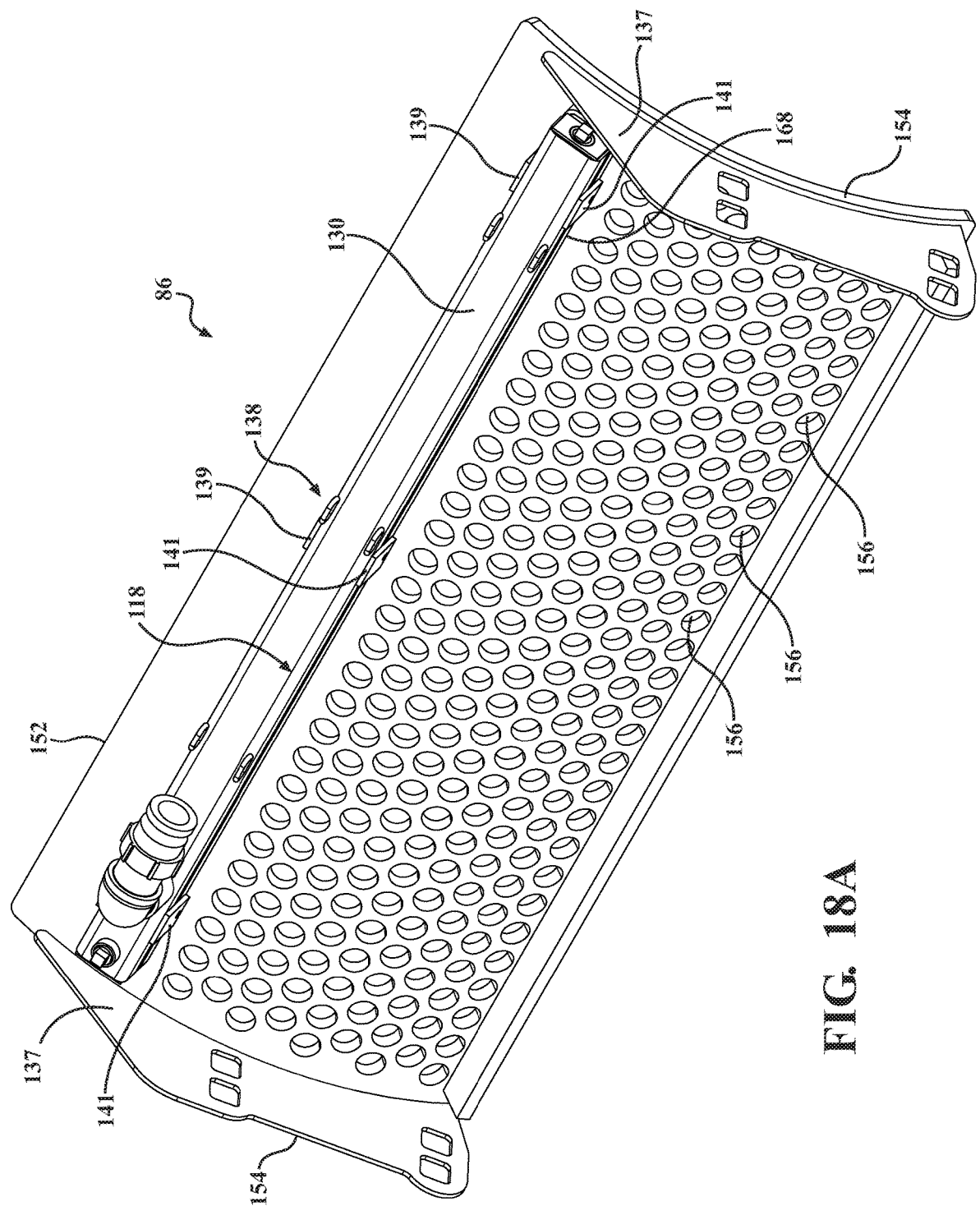
FIG. 18A is a rear perspective view of the screen of FIG. 17 having the manifold of FIGS. 15 and 16 mounted thereon.
Figure 18B:
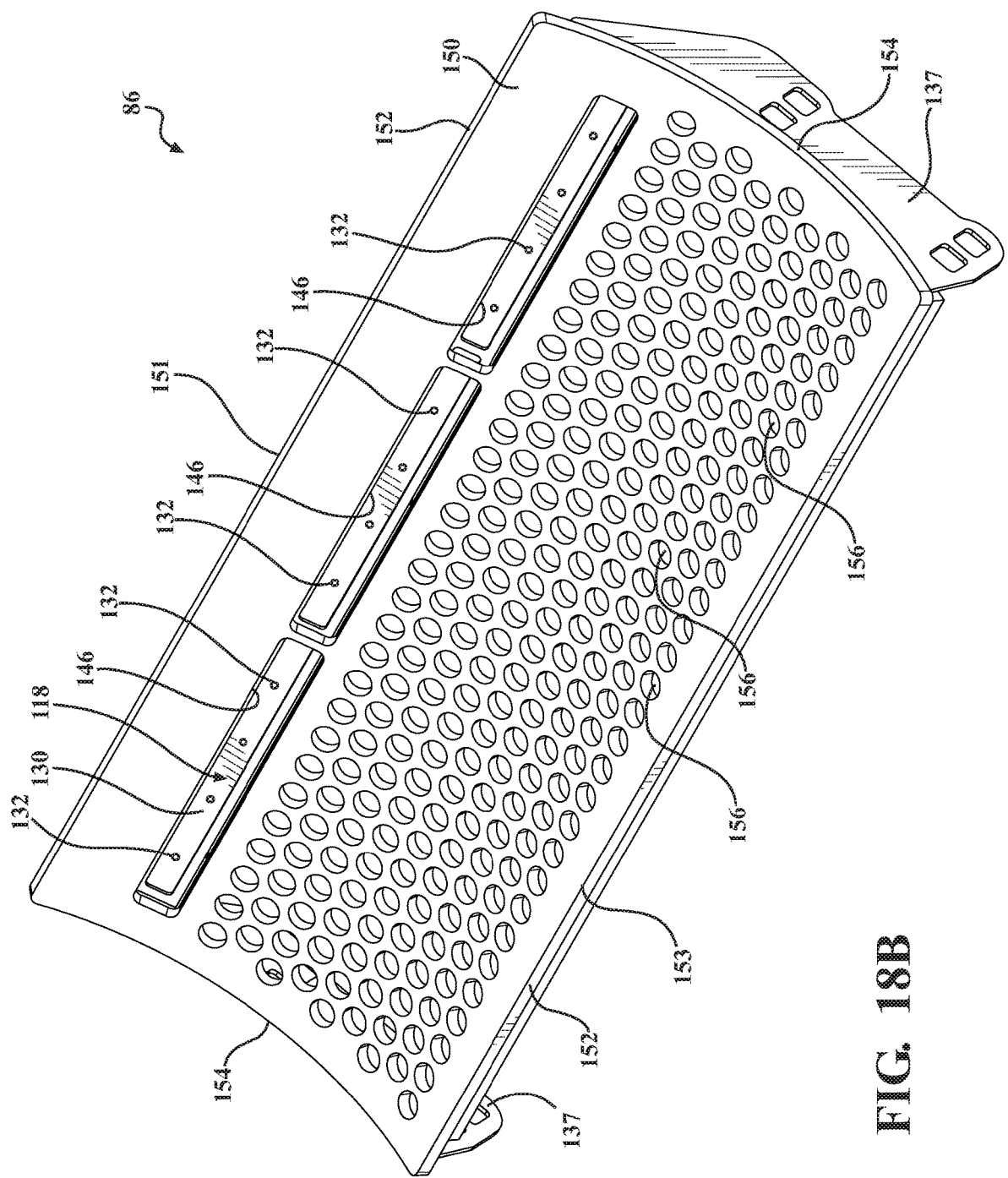
FIG. 18B is a front perspective rear view of the screen of FIG. 17 having the manifold of FIGS. 15 and 16 mounted thereon.

FIG. 17 is a rear perspective view of the screen 86. The screen 86 has the collar 168 extending therefrom. The collar 168 has holes for mounting with the manifold 118. The collar 168 also assists in sealing the manifold 118 to the screen 86. The collar 168 is shown extending about the channels 146. Referring FIG. 18A, a rear perspective view of the screen 86 is shown having the manifold 118 mounted thereon. FIG. 18B is a front perspective view showing the orifices 132 of the manifold 118 aligned with the channels 146 of the screen 86.

In operation, colorant (possibly diluted with water and/or another additive) is directed from the colorant source 113 to the manifold 118 as previously described. The colorant is under positive pressure from the pump 114 and sprayed from the manifold 118 into the reducing chamber 40 towards the rotor 48 operating in the operating direction OD. At least a portion of the sprayed colorant may effectively coat the rotor 48, and in particular the processing tool assemblies 54, and another portion of the ejected colorant may travel along the boundary of the reducing chamber 40 due to the forces from the rotational fluid flow (i.e. liquid colorant and air) as previously described. In one exemplary embodiment, the colorant is sprayed from the manifold 118 at a flow rate in the range of 55-80 gallons per minute (GPM), and more particularly in the range of 60-65 GPM.

The colorant is directed through the transition zone 49 to the inlet zone 45, and then within the inlet zone 45 towards the inlet area 44 in the operating direction OD. The colorant effectively contacts and/or mixes with the material entering the inlet area 44 on the feed conveyor 28, thereby coloring the material. The coloring of the material occurs substantially contemporaneous with the reducing operation (i.e., the reducing member 64 of the processing tool 60 engages and reduces the material such that newly exposed surfaces of the reduced material are likewise coated with colorant). As previously described, the reduced (and now colored) material is directed through the screens 86*a*, 86*b*, if sufficiently reduced, to the discharge system 16. If the material is not sufficiently reduced, the colored and partially reduced material may accumulate in the basin 98 and ultimately undergo a third or subsequent reducing operation against the anvil 108. The second or subsequent reducing operation may also be associated with further coloring from the colorant "coating" the processing tool assemblies 54.

Based on the improved material reducing system 42 of the present disclosure, substantially an entirety of the reduced and colorized material is directed through the screens 86*a*, 86*b*. In other words, substantially an entirety of the reduced and colorized material is discharged to the discharge system 16 on a first colorizing pass alongside the screens 86*a*, 86*b*. Thus, at least substantially an entirety of the colorant is applied directly to the rotor 48, and negligible material passes the screens 86*a*, 86*b* within the outlet zone 47 such that negligible colorant is applied directly to material in the outlet zone 47.

The present disclosure contemplates improved methods for providing colorizing on the initial reducing operation such that negligible colorant is applied directly to material. One exemplary method comprises an incremental two-stage reducing operation. In a general sense, each stage of the two-stage reducing operation partially reduces the material with the colorant applied during the latter stage. The colorant may or may not be applied during the first of the two-stage reducing operation, but preferably only to the partially reduced material during the second of the two-stage reducing operation. Application of the colorant to the already partially reduced material (from the first of the two-stage reducing operation) provides improved coverage of the colorant and increases the likelihood the second of the two-stage reducing operation sufficiently reduces the material to pass through the screens 86*a*, 86*b*.

Each stage of the two-stage reducing operation will now be described in turn. During the first of the two-stage reducing operation, another fixed screen (not shown) comprising relatively larger openings is utilized. The fixed screen is removably secured at a suitable position about the reducing chamber 40, preferably proximate the outlet zone 47. The fixed screen with the larger openings may not include the manifold 118.

Unreduced material is loaded onto the feed conveyor 28 of the infeed system 12 directing the material towards the reducing system 14. The unreduced material may be substantially non-uniform at this point; i.e., the unreduced material comprises material of different types, sizes, shapes, etc. For example, in the first of the two-stage reducing operation, the unreduced material may comprise tree stumps, vegetation, branches, salvaged wood, leaves, dirt, and the like.

The reducing system 14 reduces the material as previously described herein. At this point, the colorizer system 110 is selectively inoperable such that no colorant is applied to the material being reduced in the first of the two-stage reducing operation. Based on the effectiveness of the material reducing system 42 and the relatively larger openings of the fixed screen, at least most of the partially reduced material is able to pass to the discharge system 16 without requiring the auxiliary feed system 100. The partially reduced material is discharged and collected through means commonly known in the art. The partially reduced material generally comprises a uniform type and size; e.g., pieces of wood all comprising a size smaller than the openings of the fixed screen.

The fixed screen is removed, and a second fixed screen (i.e., the fixed screen 86*a* of FIGS. 13 and 14) is removably secured. The second fixed screen 86*a* comprises the openings 156 relatively smaller than the openings of the first fixed screen. In one example, the second fixed screen 86a comprises same or similarly sized openings as the openings of the movable screen 86b. The fixed screen 86a and second fixed screen may be configured to be interchangeably secured within the waste processing machine 10 with the same or similar means of attachment. In one example, the screens may be slidably removed in a direction parallel to the major axis of the rotor 48.

The manifold 118 may be mounted to the fixed screen 86a in the manner previously described. The manifold 118 mounted to the fixed screen 86a prior to installation of the fixed screen 86a improves efficiency of the multi-stage reducing and colorizing operation. In other words, the operator may mount the fixed screen 86a to the housing 84, after which coupling the line 121 readies the colorizer system 110 for operation. The partially reduced material is loaded onto the feed conveyor 28 of the infeed system 12 directing the material towards the reducing system 14. During this second of the two-stage reducing operation, the colorizer system 110 is selectively operable such that colorant is applied to the material being further reduced. Since the partially reduced material is more uniform in type and shape relative to the first of the two-stage reducing operation, the colorant is relatively more uniformly applied to the material being further reduced. Furthermore, the material reducing system 42 sufficiently reduces the colorized material to pass through the relatively smaller openings of the second fixed screen with negligible utilization of the auxiliary feed system 100.

The incremental reduction of the material in each of the two-stage reducing operation is associated with several advantages. Nearly all of the material passes through the fixed screen 86a (and/or the fixed and movable screens 86a, 86b) during each of the two stages, thereby minimizing material accumulation within the reducing chamber 40 and avoiding application of the colorant directly to the reduced material in the outlet zone 47. Positioning the manifold 118 within the outlet zone 47 and directing the colorant towards the material reducing system 42 is associated with improved coverage of the colorant on the reduced material relative to known systems that apply the colorant to a "cloud" of suspended material within the chamber. Second, the incremental reduction of material provides substantially uniform colorized material of any desired size based on the interchangeable fixed screens comprising openings of desired shapes and/or sizes.

Third, because the colorant is directed towards the material reducing system 42 (and not the material itself), the manifold 118 may comprise a simplified design relative to known colorizer systems. Known systems require complex processes to control the amount and type of colorant ejected from each of one or more openings and/or multiple manifolds in an attempt to achieve uniform application. The exemplary manifold 118 described herein comprises a singular inlet 134 in fluid communication with the plurality of openings 156. The colorant received under pressure from a colorant source 112 may be sprayed through all of the orifices 132 at substantially the same pressure towards the material reducing system 42, thereby greatly reducing complexity of the colorizer system 110. The design of the reducing chamber 40 and the efficiency of the material reducing system 42 provides the desired uniform reduction and colorization as previously described. Other advantages are readily appreciated to those having skill in the art.

Furthermore, the present disclosure contemplates that the exemplary methods may comprise fewer or greater stages than the two-stage reducing operation described herein. For example, should the waste material received be a partially or substantially uniform, a user may opt to utilize a fixed screen with relatively smaller openings with the colorizer system 110 operable. For another example, a user may opt to incrementally reduce the material several times before colorizing the reduced material. The two-stage reducing operation described here is but one non-limiting example.

Because of the reduced complexity of the colorizer system 110, the system may be retrofit or otherwise installed on existing waste processing machines. The manifold 118 may be mounted adjacent the reducing chamber 40 as best shown in FIG. 4. Disposing the manifold 118 external to the reducing chamber 40 may prevent wear through the material and other non-reducible debris moving chaotically within the reducing chamber 40 during operation of the waste processing machine 10. The present disclosure contemplates the manifold 118 may be mounted to any suitable structure at any suitable location.

Several of the components of the colorizer system 110 may be disposed remote from the waste processing machine 10 and removably coupled prior to operation. For example, the colorant source 112, the additive source 113, the pump(s) 114, and/or the valve(s) 116 may be disposed on a movable cart-like structure, as shown in FIGS. 1 and 14. When the colorizer system 110 is intended to be operable, the cart is positioned adjacent the waste processing machine 10 and one of the lines 120 (e.g., a flexible hose) is coupled to a threaded end at the inlet 134 of the manifold 118. The electric and electronic components of the colorizer system 110 are electrically coupled to a power source (e.g., on the waste processing machine 10 or externally). The embodiment of the colorizer system 110 disposed on a cart provides modularity of the system and quick coupling and decoupling from the waste processing machine 10. Additionally or alternatively, the present disclosure contemplates that the colorizer system 110 may be fully integrated with the waste processing machine 10. More specifically, the colorant source 112, the additive source 113, the pump(s) 114, and/or the valve(s) 116 may be disposed on the frame 22 at any suitable location and mounted in any suitable manner. Those having skill in the art readily appreciate that the colorizer system 110 of the present disclosure may be incorporated into the waste processing machine 10 in other similarly advantageous manners.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A material processing machine for reducing and colorizing waste material, said material processing machine comprising:
   a frame;
   an infeed system supported by said frame;
   a discharge system supported by said frame and spaced from said infeed system;
   a housing supported by said frame between said infeed and discharge systems with said housing defining a reducing chamber, and with said reducing chamber in turn defining an inlet zone adapted to receive the waste material from said infeed system, and an outlet zone spaced from said inlet zone adapted to direct reduced, colored, waste material to said discharge system;

a rotor rotatably supported by said frame within said reducing chamber with said rotor partially disposed within both said inlet and outlet zones for rotating during a material reducing operation, and said rotor having a plurality of processing tools adapted to reduce the waste material within at least said inlet zone during said material reducing operation;

a colorizer system comprising a screen, a pump, and a manifold;

said screen coupled to said housing in said outlet zone with said screen separating said reducing chamber and said discharge system and said screen having a plurality of apertures;

said manifold comprising an inlet in fluid communication with said pump for directing a colorant through said manifold; and said manifold disposed adjacent to said screen and said manifold having a plurality of orifices aligned with at least a portion of said plurality of apertures for directing the colorant through said screen in a direction of said processing tools within said outlet zone such that rotation of said rotor and said processing tools, with the colorant disposed thereon, provides for substantially contemporaneous reducing of the waste material within said inlet zone and colorizing of the waste material within at least said inlet zone.

2. The material processing machine of claim 1, wherein said manifold is positioned external to said reducing chamber.

3. The material processing machine of claim 2, wherein said manifold further defines an elongate chamber with said plurality of orifices in fluid communication with said elongate chamber.

4. The material processing machine of claim 3, wherein said plurality of orifices are equally spaced along said elongate chamber.

5. The material processing machine of claim 3, wherein said plurality of apertures of said screen further comprises at least one channel.

6. The material processing machine of claim 5, wherein said manifold is positioned adjacent said at least one channel to direct the colorant from at said orifices through said channel.

7. The material processing machine of claim 6, wherein said manifold is in sealing engagement with said screen about said at least one channel for preventing reduced material from passing through said channel.

8. The material processing machine of claim 7, wherein said manifold is mounted directly to said screen about said at least one channel.

9. The material processing machine of claim 7, wherein said plurality of apertures of said screen further comprises a plurality of openings different from said at least one channel.

10. The material processing machine of claim 9, wherein said screen has an arcuate face with a top edge and a bottom edge and defined between opposing lengthwise sides separated by opposing widthwise sides with a width spanning substantially across said reducing chamber.

11. The material processing machine of claim 10, wherein said at least one channel is disposed in said arcuate face of said screen.

12. The material processing machine of claim 11, wherein said plurality of openings are disposed in said arcuate face of said screen.

13. The material processing machine of claim 12, wherein said plurality of openings are spaced from said at least one channel.

14. The material processing machine of claim 12, wherein said plurality of openings are adjacent said bottom edge and said at least one channel is positioned above said openings nearer to said top edge relative to a counterclockwise operating direction of said rotor such that the rotation of said rotor in an operating direction passes the waste material that was colorized and reduced within said inlet zone through said screen to said discharge system.

15. The material processing machine of claim 1, further comprising a mounting system to removably couple said manifold to said screen, wherein said mounting system includes a flange extending from said manifold and a bracket secured to said screen for mounting therebetween.

16. The material processing machine of claim 1, wherein said screen is arcuate and has a radius of curvature approximate the rotor.

17. The material processing machine of claim 1, wherein said housing comprises at least two barriers angled relative to one another to define an upper recess above said rotor with said upper recess adapted to minimize throttling effect of high speed fluid and material flow within said reducing chamber and to provide clearance for non-reducible objects during the material reducing operation.

* * * * *